(12) United States Patent
Koyama et al.

(10) Patent No.: US 11,721,040 B2
(45) Date of Patent: Aug. 8, 2023

(54) IMAGING SYSTEM, CALIBRATION METHOD, AND CALIBRATOR

(71) Applicant: Panasonic Intellectual Property Management Co., Ltd., Osaka (JP)

(72) Inventors: Tatsuya Koyama, Kyoto (JP); Toshiyasu Sugio, Osaka (JP); Yoichi Sugino, Osaka (JP); Toru Matsunobu, Osaka (JP); Satoshi Yoshikawa, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 651 days.

(21) Appl. No.: 16/577,403

(22) Filed: Sep. 20, 2019

(65) Prior Publication Data

US 2020/0027242 A1  Jan. 23, 2020

Related U.S. Application Data

(63) Continuation of application No. PCT/JP2018/012301, filed on Mar. 27, 2018.

(30) Foreign Application Priority Data

Mar. 31, 2017  (JP) .................................. 2017-071998

(51) Int. Cl.
*G06T 7/80* (2017.01)
*G06T 7/70* (2017.01)
(Continued)

(52) U.S. Cl.
CPC .............. *G06T 7/80* (2017.01); *B64C 39/024* (2013.01); *G06T 7/70* (2017.01); *B64U 2101/30* (2023.01); *G06T 2207/10032* (2013.01)

(58) Field of Classification Search
CPC ... B64C 2201/123; B64C 39/024; G06T 7/70; G06T 7/80
(Continued)

(56) References Cited

U.S. PATENT DOCUMENTS 5,978,521 A 11/1999 Wallack et al.
6,101,455 A  8/2000 Davis
(Continued)

FOREIGN PATENT DOCUMENTS

EP  2 755 393   7/2014
JP  2003-50107  2/2003
(Continued)

OTHER PUBLICATIONS

Office Action dated Dec. 4, 2020 issued for European Patent Application No. 18774181.4.
(Continued)

*Primary Examiner* — On S Mung
(74) *Attorney, Agent, or Firm* — Wenderoth, Lind & Ponack, L.L.P.

(57) ABSTRACT

A calibrator for a camera includes a controlling circuit, a photographing circuit, a calculating circuit, and an instructing circuit. The controlling circuit is configured to control a movable body to move into a shooting area of the camera. A marker is provided on the movable body for calibration of the camera. The photographing circuit is configured to control the camera to photograph the marker. The calculating circuit is configured to calculate at least one parameter of the camera based on the photographed marker. The instructing circuit is configured to transmit the at least one parameter to the camera to calibrate the camera.

15 Claims, 17 Drawing Sheets

(51) Int. Cl.
B64C 39/02 (2023.01)
B64U 101/30 (2023.01)

(58) Field of Classification Search
USPC .......................................................... 702/94
See application file for complete search history.

(56) References Cited

U.S. PATENT DOCUMENTS

| | | | |
|---|---|---|---|
| 6,114,824 | A | 9/2000 | Watanabe |
| 8,619,144 | B1 | 12/2013 | Chang et al. |
| 8,662,676 | B1 | 3/2014 | Chang et al. |
| 9,286,680 | B1 | 3/2016 | Jiang |
| 2008/0228434 | A1 | 9/2008 | Aratani et al. |
| 2014/0253794 | A1 | 9/2014 | Miyazaki et al. |
| 2015/0130951 | A1 | 5/2015 | Olson et al. |
| 2016/0245899 | A1 | 8/2016 | Rybski |
| 2017/0032529 | A1 | 2/2017 | De Villiers et al. |
| 2017/0221210 | A1* | 8/2017 | Martinello ............... G06T 7/80 |
| 2017/0243374 | A1 | 8/2017 | Matsuzawa |
| 2018/0047184 | A1 | 2/2018 | Uchiyama et al. |
| 2018/0194007 | A1 | 7/2018 | Namiki et al. |
| 2018/0194008 | A1 | 7/2018 | Namiki et al. |
| 2019/0015991 | A1 | 1/2019 | Liu et al. |
| 2021/0027496 | A1 | 1/2021 | Koyama et al. |

FOREIGN PATENT DOCUMENTS

| | | |
|---|---|---|
| JP | 2004-235934 | 8/2004 |
| JP | 2008-224626 | 9/2008 |
| JP | 2009-88726 | 4/2009 |
| JP | 2010-210570 A | 9/2010 |
| JP | 2015-22510 | 2/2015 |
| JP | 2018-26724 | 2/2018 |
| WO | 2014/083386 | 6/2014 |

OTHER PUBLICATIONS

Office Action dated Aug. 28, 2020 in U.S. Appl. No. 16/580,185.
Extended European Search Report dated Feb. 11, 2020 in European Patent Application No. 18774181.4.
International Search Report (ISR) dated May 29, 2018 in International (PCT) Application No. PCT/JP2018/012302.
Gregorij Kurillo et al., "Wide Area External Multi-Camera Calibration Using Vision Graphs and Virtual Calibration Object," IEEE, Sep. 2008, pp. 1-9.
Daniel Martinec et al., "A Convenient Multicamera Self-Calibration for Virtual Environments," Presence, vol. 14, No. 4, Aug. 2005, pp. 407-422.
Notice of Allowance and Notice of Allowability dated Apr. 19, 2021 issued for U.S. Appl. No. 16/580,185.
Extended European Search Report dated Feb. 14, 2020 in corresponding European Patent Application No. 18776529.2.
Lin Mingxiu et al., "Design of LED Marker for Camera Calibration of Rapid Deployment", Chinese Control and Decision Conference, IEEE, XP032936615, pp. 1132-1136, May 2016.
Office Action dated Jan. 12, 2021 in U.S. Appl. No. 16/580,185.
Communication under Rule 71(3) EPC dated Dec. 23, 2020 in counterpart European Patent Application No. 18776529.2.
International Search Report (ISR) dated May 29, 2018 in International (PCT) Application No. PCT/JP2018/012301.

* cited by examiner

| NO. | TIME | CALIBRATION TARGET | REASON |
|---|---|---|---|
| 0021 | 19:25:30 | 10 A | 20: PAN HEAD ROTATED/MOVED |

| NO. | TIME | CALIBRATION TARGET | REASON |
|---|---|---|---|
| 0045 | 20:02:05 | All | 100: HALFTIME DETECTED |

| THREE-DIMENSIONAL COORDINATES | TWO-DIMENSIONAL COORDINATES |
|---|---|
| p1( 0, 0, 0) | P1( 10, 10) |
| p2(10, 0, 0) | P2(600, 10) |
| p3( 0, 10, 0) | P3( 10, 400) |
| p4(10, 10, 0) | P4(600, 400) |

IMAGING SYSTEM, CALIBRATION METHOD, AND CALIBRATOR

CROSS REFERENCE TO RELATED APPLICATIONS

This application is a U.S. continuation application of PCT International Patent Application Number PCT/JP2018/012301 filed on Mar. 27, 2018, claiming the benefit of priority of Japanese Patent Application Number 2017-071998 filed on Mar. 31, 2017, the entire contents of which are hereby incorporated by reference.

BACKGROUND

1. Technical Field

The present disclosure relates to an imaging system, a calibration method, and a calibrator.

2. Description of the Related Art

Japanese Unexamined Patent Application Publication No. 2015-022510 describes a technology of reproducing a three-dimensional shape of a subject from videos captured by a plurality of cameras. According to Japanese Unexamined Patent Application Publication No. 2015-022510, a free-viewpoint image is generated using the three-dimensional shape.

SUMMARY

According to one aspect of the present disclosure, an imaging system calibrates a parameter of an imaging apparatus disposed in a predetermined position, the imaging system including: a movement controller that causes a movable object that includes a marker for use in calibration to move into an imaging area of the imaging apparatus; an imaging controller that causes the imaging apparatus to image the marker; and a calibrator that calibrates an internal parameter of the imaging apparatus, using an image that includes the marker, the image being captured by the imaging apparatus imaging the marker.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
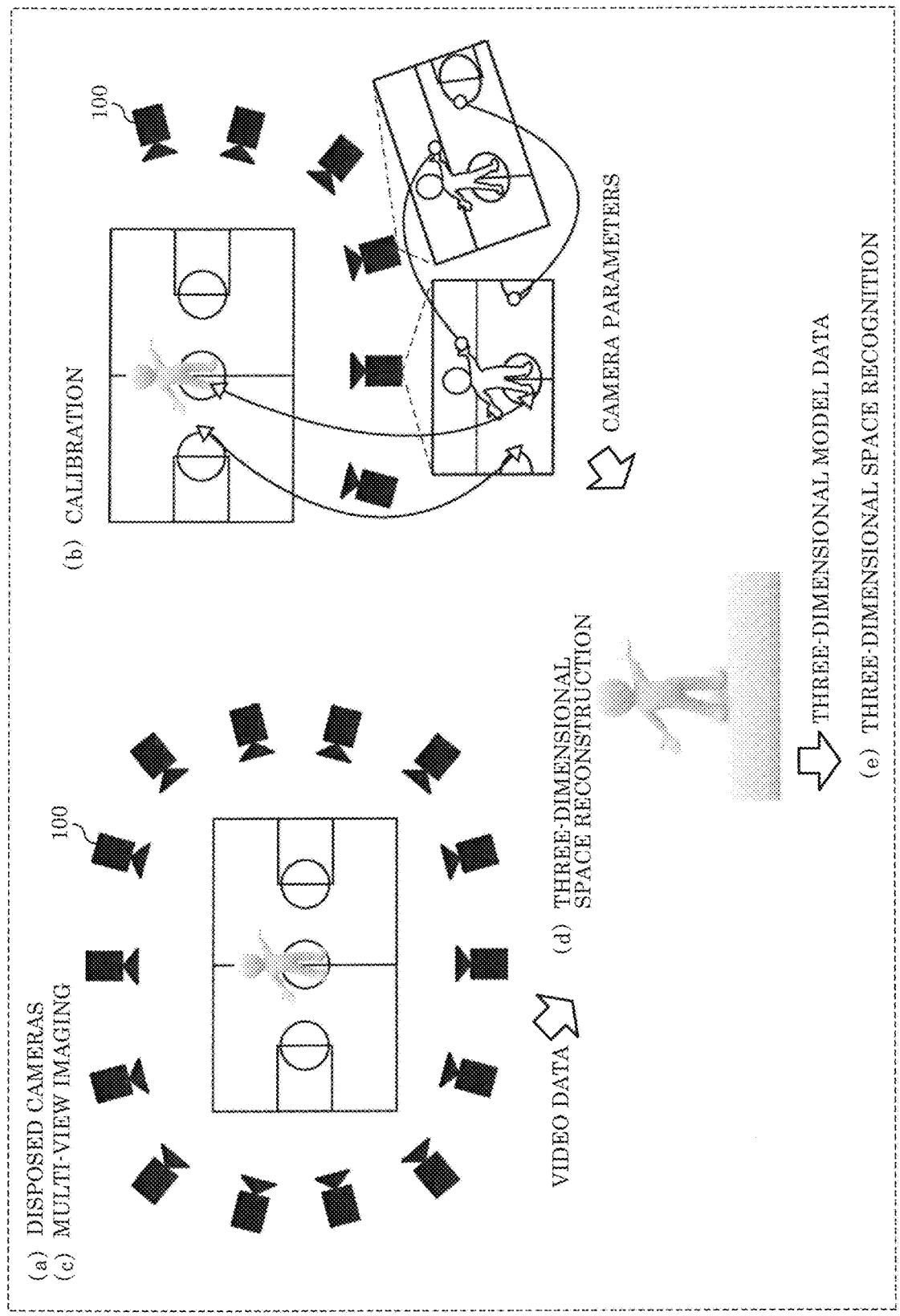
FIG. 1 illustrates an outline of three-dimensional space recognition.

Underlying Knowledge Forming Basis of the Present Disclosure

A result of three-dimensional space reconstruction by a three-dimensional space reconstruction apparatus that reconstructs (models) a three-dimensional shape of a subject is used to generate a free viewpoint video in a three-dimensional space. The three-dimensional space reconstruction apparatus performs modeling, using video data provided from an imaging system that includes a plurality of cameras that capture videos of the same scene, and camera parameters obtained by calibration, which indicate, for instance, positions and orientations of the plurality of cameras. Accordingly, if the focal distance of a camera, for instance, is changed after calibration, a camera parameter does not reflect the actual state of, for instance, the focal distance of the camera, and thus a three-dimensional space cannot be appropriately reconstructed. As a result, the quality of a free viewpoint video deteriorates, or even generation of a free viewpoint video fails. Accordingly, it is necessary to periodically calibrate parameters of a camera.

A predetermined space imaged by such an imaging system is, for example, a venue where sporting events are held, and a plurality of cameras are disposed, surrounding the predetermined space. Accordingly, if parameters are to be calibrated for each camera, it is necessary to bring a marker for use in camera calibration close to the camera, and cause the camera to image the marker, which results in a problem of time-consuming labor.

As described above, a conventional technology cannot readily calibrate internal parameters of an imaging apparatus disposed in a predetermined position.

In view of this, an imaging system according to an aspect of the present disclosure is an imaging system that calibrates a parameter of an imaging apparatus disposed in a predetermined position, the imaging system including: a movement controller that causes a movable object that includes a marker for use in calibration to move into an imaging area of the imaging apparatus; an imaging controller that causes the imaging apparatus to image the marker; and a calibrator that calibrates an internal parameter of the imaging apparatus, using an image that includes the marker, the image being captured by the imaging apparatus imaging the marker.

According to this, the movable object is used to move the marker into an imaging area of an imaging apparatus, and the imaging apparatus is caused to image the marker, so that the internal parameter of the imaging apparatus is calibrated. Thus, the internal parameter of the imaging apparatus can be calibrated without a person bringing the marker close to the imaging apparatus. Accordingly, the internal parameter of the imaging apparatus disposed in a predetermined position can be readily calibrated.

The movement controller may cause the movable object to move, to cause the marker to be imaged over entirety of an image sensor that is included in the imaging apparatus.

Accordingly, the internal parameter of the imaging apparatus can be effectively calibrated.

Using a result obtained by processing an image captured by the imaging apparatus, the movement controller may cause the movable object to move, to include the marker over entirety of an image captured by the imaging apparatus.

Accordingly, the internal parameter of the imaging apparatus can be calibrated readily and effectively.

When a superimposed image is assumed to be generated by superimposing images captured by the imaging apparatus at different times and each including the marker, the movement controller may cause, using a result obtained by processing an image captured by the imaging apparatus, the movable object to move, to distribute the markers over entirety of the superimposed image.

Accordingly, the internal parameter of the imaging apparatus can be effectively calibrated.

Using a result obtained by processing an image captured by the imaging apparatus, the movement controller may cause the movable object to move to positions in which the markers that have sharpness higher than or equal to predetermined sharpness are captured in the images.

Accordingly, the internal parameter of the imaging apparatus can be accurately calibrated.

The imaging controller may cause the imaging apparatus to capture an image in a state in which the imaging apparatus has at least one of a predetermined focal distance or a predetermined aperture.

Accordingly, the internal parameter of the imaging apparatus can be effectively calibrated.

The marker may have first feature points, and the calibrator may obtain information indicating a relative positional relationship of the first feature points, and calibrate the internal parameter of the imaging apparatus, using the information and second feature points obtained by processing the image including the marker and captured by the imaging apparatus.

Accordingly, the internal parameter of an imaging apparatus can be effectively calibrated.

Note that these general and specific aspects may be implemented using a system, a method, an integrated circuit, a computer program, a computer-readable recording medium such as a CD-ROM, or any combination of systems, methods, integrated circuits, computer programs, and recording media.

The following specifically describes an imaging system and a calibration method according to an aspect of the present disclosure, with reference to the drawings.

Note that the embodiments described below each indicate a specific example of the present disclosure. The numerical values, shapes, materials, elements, the arrangement and connection of the elements, steps, and the processing order of the steps, for instance, described in the following embodiments are mere examples, and thus are not intended to limit the present disclosure. Among the elements in the following embodiments, elements not recited in any of the independent claims defining the broadest inventive concepts are described as optional elements.

The following describes Embodiment 1 with reference to FIG. 1 to FIG. 9D.

Embodiment 1

[1. Outline of Three-Dimensional Space Recognition]

First, an outline of three-dimensional space recognition in which an imaging system according to the present embodiment is used is to be described with reference to FIG. 1.

The imaging system includes a plurality of cameras to image the same scene in a predetermined space. A specific example of the predetermined space is a venue where a sporting event is held, and a specific example of the same scene is a scene of a match held in the venue. As another example, the predetermined space is a space that is monitored by monitoring cameras, and the same scene includes, for example, the state of a person or an object present in the space being monitored.

The cameras capture videos of areas that at least partially overlap one another in the space, from positions different from one another. For example, as illustrated in (a) of FIG. 1, a plurality of cameras 100 surround a space that is a venue of a sport match and are disposed in positions different from one another. Cameras 100 are in orientations different from one another, so that imaging areas of cameras 100 each cover at least a portion of the space. The imaging areas of cameras 100 are caused to at least partially overlap one another because virtual reconstruction of a three-dimensional space (the three-dimensional space reconstruction) uses video data that are generated by imaging the same subject from a plurality of viewpoints.

Causing the imaging areas to overlap one another may not involve an imaging area of one camera 100 overlapping imaging areas of all other cameras 100, and thus the imaging area may overlap an imaging area of at least one of other cameras 100.

Cameras 100 disposed in such a manner are communicatively connected to a later-described control apparatus included in the imaging system.

If cameras 100 are disposed, calibration is performed.

Calibration is to calculate parameters that indicate a position and an angle of a imaging direction (orientation) of each camera 100 by associating an actual point in an imaging area of each camera 100 and a point in a video (association between points illustrated by white triangles that are connected by curves in (b) of FIG. 1) or by associating points in videos captured by different cameras 100 (association between points illustrated by white circles that are connected by curves in (b)). Parameters that indicate a position and an orientation of camera 100 are represented in a common coordinate system in a predetermined space that is a three-dimensional space, and are camera parameters that are later used in three-dimensional space reconstruction. The camera parameters will be described later.

Calculating the camera parameters and making the camera parameters known are preparation for performing three-dimensional space recognition, and are performed before start of the three-dimensional space recognition. The calculated camera parameters are transmitted to a later-described three-dimensional space reconstruction apparatus that performs three-dimensional space reconstruction.

After such preparation, cameras 100 perform multi-view imaging by capturing synchronized videos based on signals from the control apparatus ((c) of FIG. 1). Video data generated by the multi-view imaging is transmitted to the three-dimensional space reconstruction apparatus.

In the three-dimensional space reconstruction performed by the three-dimensional space reconstruction apparatus, the video data and the camera parameters are used to generate three-dimensional model data of the subject in the imaging areas ((d) of FIG. 1). The three-dimensional model data is transmitted to the later-described three-dimensional space recognition apparatus that performs three-dimensional space recognition.

Examples of the functions provided by the three-dimensional space recognition that the three-dimensional space recognition apparatus performs using the three-dimensional model data ((e) of FIG. 1) include the above-described generation of a free-viewpoint video, scene analysis, and tracking.

A simple example of a method for generating a free-viewpoint video is to be described. First, a structure of each subject in an imaging area viewed from a virtual viewpoint that is designated by a user or a system administrator or is set automatically, and a distance between the viewpoint and the subject are calculated based on the three-dimensional model data. Next, information on a color and texture of each subject is acquired preferentially from video data captured by camera 100 that is closer to the virtual viewpoint than any other cameras 100. Finally, the information on a color and texture, the calculated structures of subjects, and the calculated distances to the subjects are used to generate (render) a video that is viewed from the virtual viewpoint. The rendered video is distributed to a video display terminal of the user.

Such a function of generating a free-viewpoint video can be used in a field of entertainment, such as a sport program on television. This allows, for example, a viewer to play a video of a scene highlight from a viewpoint requested by the viewer. The function of generating a free-viewpoint video may be used in the monitoring system. In this case, it is possible to present, to a security guard, an estimated appearance of a suspicious person viewed from a viewpoint from which images are not captured by an actual camera, so that the security guard can keep a lookout for the suspicious person.

It is also possible in the scene analysis and the tracking to calculate a structure of each subject in an imaging area seen from a virtual viewpoint and a distance between the subject and the virtual viewpoint based on the three-dimensional model data, as in the generation of a free-viewpoint video, and to use information on a color and texture of the subject that is acquired preferentially from camera 100 that is closer to the virtual viewpoint than any other cameras 100.

The scene analysis is performed by analyzing a video showing the state of each subject in an imaging area such as a person or an object at a moment, by using software or by a person watching the video on a screen. By performing the scene analysis based on three-dimensional model data, it is possible to observe a three-dimensional orientation of a person in an imaging area or a three-dimensional shape of an object in an imaging area, which allows more accurate situation recognition and prediction than those performed using two-dimensional videos.

In the tracking, for example, a subject in an imaging area is identified by analyzing scenes in videos captured by cameras 100. In addition, the same subjects among identified subjects in videos that are captured by cameras 100 at a moment are associated with one another by software or manually. Subjects are identified and associated in such a manner along a time axis, thus carrying out tracking. There is, however, a case where a subject of interest in two-dimensional videos captured by cameras 100 cannot be continuously identified because the subject is temporarily hidden behind another subject. Also in such a case, if three-dimensional model data is used, each subject can be continuously identified using three-dimensional position information or three-dimensional shape information of the subject.

Such functions of the scene analysis and the tracking can be used, for example, in the next-generation monitoring system described above. This is expected to achieve early detection of a suspicious scene and an increase in the accuracy of the detection. In addition, this achieves tighter security than the security achieved by a conventional technique even in a location where a limited number of cameras can be disposed.

All of the functions for the three-dimensional space recognition such as the generation of a free-viewpoint video, the scene analysis, and the tracking are assumed to be used as both after-the-fact use and real-time use. Each of the functions may be selected according to intended use, and implemented in a system that includes a computer having performance appropriate to the selection, particularly performance that relates to video processing.

As seen from the above, three-dimensional video data based on the three-dimensional model data is used for all of the functions of the three-dimensional space recognition. This three-dimensional model data is generated by three-dimensional space reconstruction (modeling) based on video data captured by cameras 100 and the camera parameters of cameras 100 calculated through the calibration.

The camera parameters include external parameters that indicate positions and orientations of the cameras in the three-dimensional space, and internal parameters that indicate optical properties of the cameras such as focal distance, aberration, and image center. A correlation between a point (u, v) on a two-dimensional video captured by a camera and a point (x, y, z) in an imaging area, which is a three-dimensional space shown in the two-dimensional video, is derived from the camera parameters. That is, use of camera parameters of a camera allows points on a two-dimensional video captured by the camera to be projected into a captured three-dimensional space. The projection into the three-dimensional space is the above three-dimensional space reconstruction ((d) of FIG. 1).

The camera parameters of cameras 100 above are represented in a common three-dimensional coordinate system that is set in the imaging areas. The camera parameters of cameras 100 are then calculated such that the same location (point) in imaging areas in videos captured by cameras 100 is projected from the videos to the same point in the three-dimensional coordinate system ((b) of FIG. 1).

The camera parameters are necessary to generate three-dimensional model data from video data captured by cameras 100, and accuracy of the camera parameters influences accuracy of the three-dimensional space reconstruction. The term accuracy used herein refers to accuracy of a position of camera 100 in a three-dimensional space indicated by camera parameters, that is, similarity to the actual state of camera 100. If the accuracy of the camera parameters is insufficient, the three-dimensional model data cannot be obtained.

As described with reference to FIG. 1, if the calibration is performed immediately before the imaging, the accuracy of the camera parameters is sufficient immediately after the imaging has started, but in general, the accuracy lowers with time due to shaking that occurs in a place where camera 100 is disposed, operations on camera 100, or the like. The following describes an imaging system that timely causes, even during imaging, camera 100 to perform calibration, whose camera parameters have become less accurate, so as to curb an adverse influence on three-dimensional space reconstruction due to the deterioration in the accuracy of the camera parameters, intending in turn to stabilize the accuracy and applicability of three-dimensional space recognition.

[2. Configuration of Imaging System]

Figure 2:
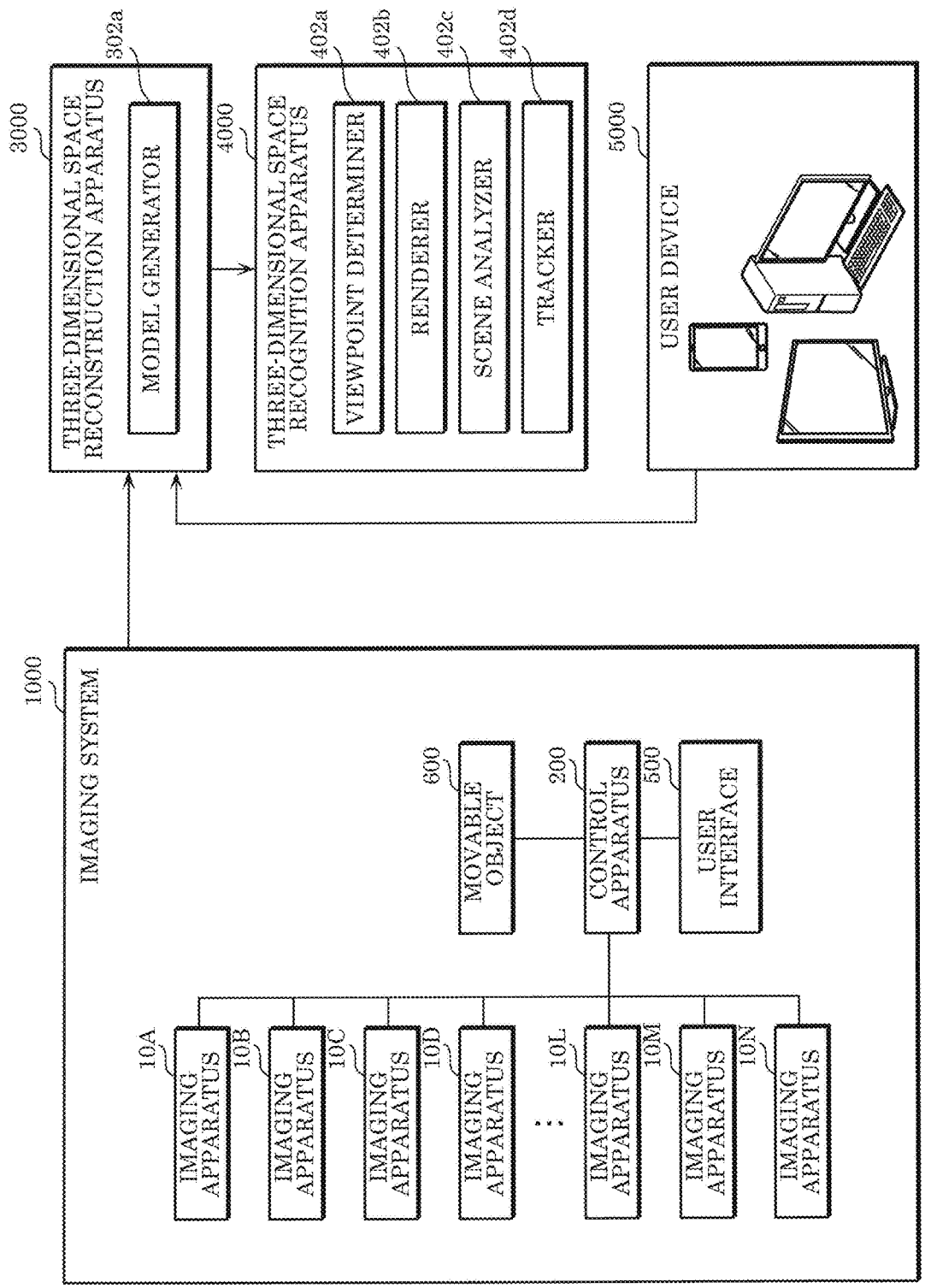
FIG. 2 is a block diagram illustrating a configuration of a multi-view imaging system in Embodiment 1.

FIG. 2 is a block diagram illustrating a configuration of an imaging system according to Embodiment 1. A three-dimensional space reconstruction apparatus and a three-dimensional space recognition apparatus that use data received from the imaging system, and a user device that receives a free-viewpoint video or the like from the three-dimensional space recognition apparatus and displays the free-viewpoint video are to be also described with reference to FIG. 2.

Imaging system 1000 according to the embodiment includes imaging apparatuses 10A to 10N, control apparatus 200, user interface 500, and movable object 600. Imaging apparatuses 10A to 10N are communicatively connected to control apparatus 200. Movable object 600 is communicatively connected to control apparatus 200 in a wireless manner.

[2-1. Configuration of Imaging Apparatus]

Figure 3:
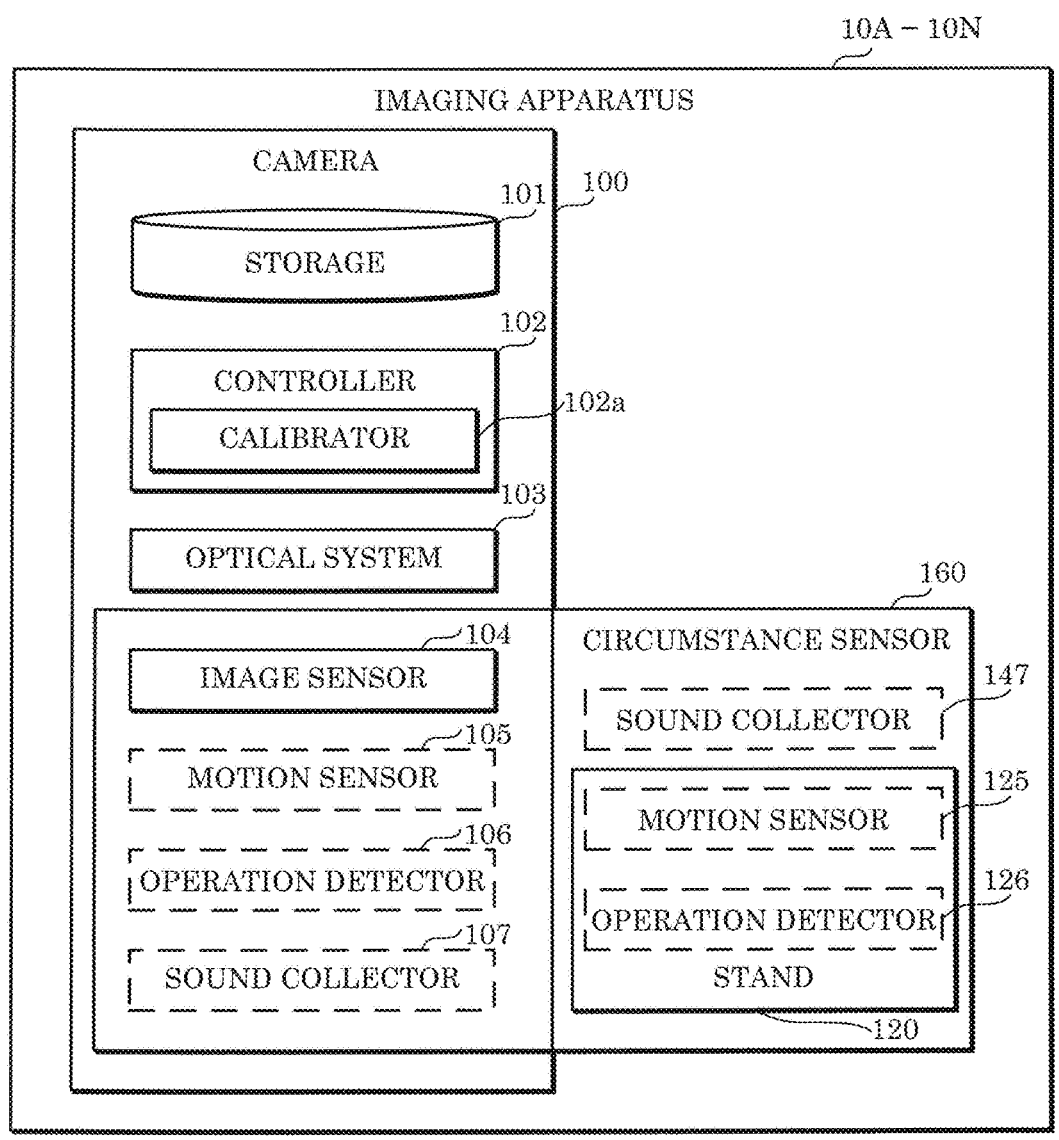
FIG. 3 is a block diagram illustrating a configuration of an imaging apparatus in Embodiment 1.

FIG. 3 is a block diagram illustrating a configuration of an imaging apparatus in Embodiment 1.

Imaging apparatuses 10A to 10N are apparatuses each including camera 100 for capturing a predetermined space, which is equivalent to camera 100 illustrated in FIG. 1, and possible configurations of imaging apparatuses 10A to 10N are the same. The term predetermined space used herein is a union of imaging areas of cameras 100.

Imaging apparatuses 10A to 10N each include camera 100, stand 120, and circumstance sensor 160. Hereinafter, since imaging apparatuses 10A to 10N have the same configuration, description focuses on imaging apparatus 10A when one imaging apparatus according to the present disclosure is to be described. Thus, the following description of imaging apparatus 10A also applies to other imaging apparatuses 10B to 10N.

Camera 100 includes storage 101, controller 102, optical system 103, and image sensor 104.

Storage 101 stores a program that is read and executed by controller 102. Storage 101 temporarily stores video data on an imaging area captured using image sensor 104, meta information such as a time stamp that is to be attached to the video data, information obtained through sensing by circumstance sensor 160 described later, camera parameters of camera 100, and imaging settings such as a frame rate or a resolution that is being applied. Storage 101 may store shape information that indicates the shape of marker 606 described below. A specific example of shape information is later described.

Such storage 101 is implemented by use of a rewritable, nonvolatile semiconductor memory such as a flash memory. In addition, a read-only memory (ROM), which is non-rewritable, or a random access memory (RAM), which is volatile, can be used as storage 101 according to whether data to be stored needs to be overwritten, how long the data has to be stored, or the like.

The number of imaging apparatuses included in imaging system 1000 is not limited as long as more than one imaging apparatus is included. In addition, imaging apparatuses 10 need not have common properties. Imaging apparatuses 10 are not limited to monaural cameras and may include stereo cameras.

Controller 102 is implemented by, for example, use of a central processing unit (CPU) and reads and executes the program stored in storage 101 described above to control elements included in camera 100, thus allowing the imaging function and other functions to be carried out. The other functions include the calculation of camera parameters, that is, the calibration. Calibrator 102a included in controller 102 is an element that is implemented by controller 102 executing a program for the calibration. Note that control unit 102 may be implemented by a dedicate circuit that controls the elements included in camera 100, to allow the imaging function and other functions to be carried out. Thus, control unit 102 may be implemented by software or by hardware.

In response to a user operation or when calibration information is input from control apparatus 200 described later, calibrator 102a performs the calibration according to the contents of the calibration information. Calibrator 102a calibrates the internal parameters of imaging apparatus 10A, using an image captured by imaging apparatus 10A, which includes marker 606. The calibration is performed by, for example, associating coordinates of a specific point (or a line or a surface including a plurality of points) in the three-dimensional space that is the imaging area with a point (or a line or a surface including a plurality of points) in a two-dimensional video. The calibration is alternatively performed by associating specific points (or lines or surfaces including a plurality of points) in videos of imaging areas that at least partially overlap among two-dimensional videos captured by imaging apparatuses 10A to 10N. Such association may be performed automatically by calibrator 102a that executes the program. The camera parameters calculated as a result of the calibration are transmitted to three-dimensional space reconstruction apparatus 3000 as, for example, data to be used in the three-dimensional space reconstruction.

Optical system 103 is an element by which light from the imaging area is formed into an image on image sensor 104, and is implemented by use of optical elements including a lens. Optical system 103 may allow its focal distance and angle of view to be changed. A wide-angle lens or a super-wide-angle lens such as a fisheye lens may be used. For example, when videos captured by imaging system 1000 are used in a monitoring system, wide-angle lenses may be used to expand an imaging area. Properties of optical system 103 such as focal distance, aberration, and image center are used in the three-dimensional space reconstruction as the internal parameters described above. That is, when the focal distance of optical system 103 is changed or a lens of optical system 103 is changed, it is necessary to change the camera parameters used in the three-dimensional space reconstruction as in the case where a position of a camera is changed. Stated differently, the camera parameters need to be calibrated.

Image sensor 104 is implemented by a solid-state image sensor that receives light collected by optical system 103 with its light receiving surface and converts the received light into an electric signal representing an image, such as a CCD image sensor, a CMOS image sensor, and a MOS image sensor. Video data generated by image sensor 104 is transmitted to three-dimensional space reconstruction apparatus 3000 and three-dimensional space recognition apparatus 4000, so as to be used in the three-dimensional space reconstruction and the three-dimensional space recognition.

Camera 100 illustrated in FIG. 2 further includes motion sensor 105, operation detector 106, and sound collector 107. These will be described as elements of circumstance sensor 160 described later.

Stand 120 is an element that fixes and supports camera 100 in a predetermined position while camera 100 is generating video data to be used in the three-dimensional space reconstruction by imaging, and is implemented by, for example, a tripod. Note that stand 120 may allow a length and an angle of its leg to be adjusted in order to adjust a fixing position of camera 100 for preparation of the imaging. Stand 120 may include a mechanism to rotate the pan head in order to pan or tilt camera 100, an elevating mechanism to move camera 100 vertically, and the like. Alternatively, stand 120 may include a mechanism to support and move camera 100, such as a dolly and a crane.

Stand 120 illustrated in FIG. 3 further includes motion sensor 125 and operation detector 126. These will be described as elements of circumstance sensor 160 described below.

Circumstance sensor 160 senses at least one of a circumstance about camera 100 (or imaging apparatus 10A) or a circumstance in a predetermined space that includes the imaging area of camera 100 and outputs the sensed circumstance as imaging circumstance information. In other words, circumstance sensor 160 is a sensor that measures an event occurring in at least one of camera 100 and the predetermined space or is a detector that detects the occurrence of the event, and outputs a signal that indicates a result of the measurement or the detection. The output signal is transmitted to control apparatus 200, and is used by control apparatus 200 to determine whether to perform the calibration.

As long as circumstance sensor 160 is a sensor or a detector that can sense the above circumstance, a sensor or a detector included in camera 100 or stand 120 or a sensor or a detector provided separately therefrom may be used as circumstance sensor 160.

For example, image sensor 104 included in camera 100 may be used as circumstance sensor 160. In this case, control apparatus 200 determines whether to perform the calibration, based on video data output from image sensor 104. The determination is made based on, for example, changes over time in a background area that appears in video data, the number of feature points, or changes over time regarding whether a specific subject (e.g., a person, a ball, or an exhibit to be monitored) is present or not.

Camera 100 may include a sensor that perceives displacement, acceleration, vibration, tilt, and geomagnetism or includes a positioning mechanism that can sense a larger parallel translation, such as a global positioning system (GPS) receiver. A sensor (motion sensor 105) that can detect such motions (movements) of camera 100 may be used as circumstance sensor 160.

In addition, camera 100 may include a mechanism for detecting a user manual operation or an operation under control of controller 102 that executes a program, that is, an automatic operation. Examples of the operation to be detected herein include turning on and off a switch, and changing settings of optical system 103 such as focal distance and focus. A sensor (operation detector 106) that can sense such operations of camera 100 may be used as circumstance sensor 160.

Alternatively, stand 120 may include a sensor that perceives displacement, acceleration, vibration, tilt, and geomagnetism or may include a positioning mechanism such as a GPS receiver. Since a motion of camera 100 is in synchronism with a motion of stand 120 on which camera 100 is fixed, it is possible to indirectly sense whether camera 100 is moved, based on whether stand 120 is moved, for example. A sensor (motion sensor 125) that can detect such movement of camera 100 may be used as circumstance sensor 160.

Stand 120 may include a mechanism for detecting an operation caused by a user operation. An operation detected here is, for example, an operation of rotating or vertically moving the pan head. A sensor (operation detector 126) that can sense such operations on stand 120 may be used as circumstance sensor 160.

Stand 120 makes a mechanical movement due to such an operation, and thus motion sensor 125 and operation detector 126 are distinguished from each other in the configuration illustrated in FIG. 3 for the convenience of description, but may not necessarily be distinguished in practice.

There is a case where camera 100 includes sound collector 107. Alternatively, sound collector 147 that is provided separately from camera 100 may be used to collect sound produced in a scene captured by camera 100. Sound collected by sound collector 107 or 147 may indicate a circumstance about camera 100 or a circumstance in a predetermined space that includes the imaging area of camera 100. Sound can indicate, for example, that camera 100 or stand 120 has received a shock, a sporting event has had a scene highlight, or an intermission starts or ends. Sound collector 107 or 147 to collect such sound may be used as circumstance sensor 160.

As described above, various kinds of sensors can be used as circumstance sensor 160 of imaging system 1000 according to the present embodiment. In FIG. 3, among the elements that can be used as circumstance sensor 160 in the above manner, image sensor 104 always included in camera 100 is illustrated by a solid line, and the other elements are illustrated by broken lines.

Circumstance sensor 160 may not be achieved by both of the sensor included in camera 100 and the sensor included in stand 120, and it suffices that circumstance sensor 160 includes at least one of a sensor or a detector that senses at least one of the circumstance about camera 100 (or imaging apparatus 10A) or the circumstance in the predetermined space that includes the imaging area of camera 100, as exemplified above.

Imaging apparatuses 10B to 10N each include camera 100, stand 120, and circumstance sensor 160, as with imaging apparatus 10A. Possible configurations of imaging apparatuses 10A to 10N are the same as stated above, but the configurations of imaging apparatuses 10A to 10N may not be the same as long as video data generated by imaging and camera parameters are output from cameras 100 of imaging apparatuses 10A to 10N and input from imaging system 1000 to three-dimensional space reconstruction apparatus 3000. One imaging apparatus may include a plurality of cameras 100, and the number of optical systems and the number of image sensors included in camera 100 may not be one. For example, camera 100 may be a stereo camera.

[2-2. Configuration of Control Apparatus and User Interface]

Figure 4:
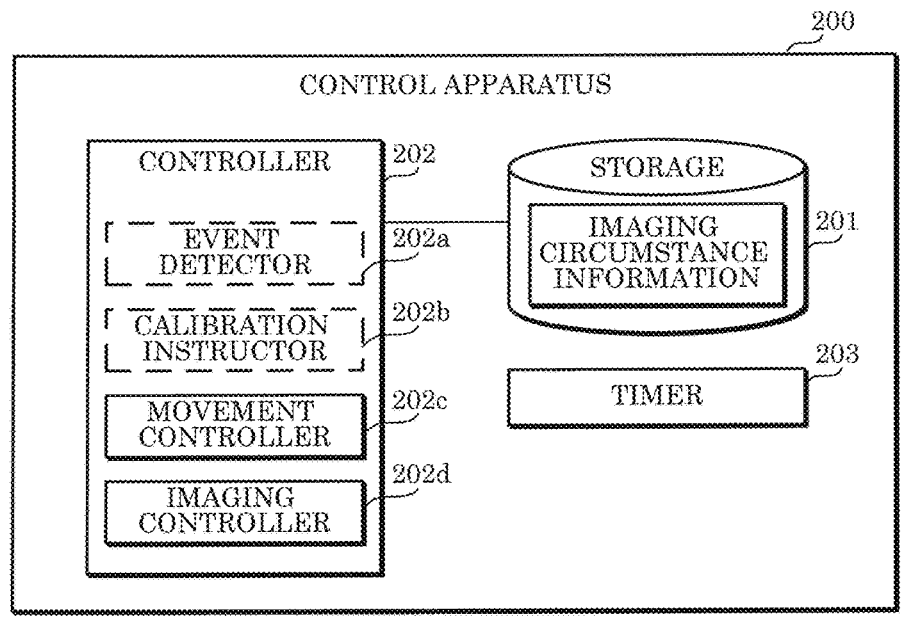
FIG. 4 is a block diagram illustrating a configuration of a control apparatus in Embodiment 1.

FIG. 4 is a block diagram illustrating a configuration of the control apparatus in Embodiment 1.

Control apparatus 200 includes storage 201, controller 202, and timer 203.

Control apparatus 200 controls imaging apparatuses 10A to 10N, and processes data received from imaging apparatuses 10A to 10N. Control apparatus 200 uses user interface 500 to present information on the control and the processing of data to a user and to receive input of instructions regarding the control and the processing of data from a user. Control apparatus 200 controls movable object 600.

An example of control apparatus 200 is a computer. In this case, storage 201 is a storage apparatus of the computer and is implemented by a hard disk drive, a semiconductor memory of any of various kinds, or a combination thereof. Controller 202 is implemented by a CPU of the computer, and timer 203 is a timer included in the computer and referred to by the CPU. User interface 500 is implemented by a display apparatus, a touch screen, a track pad, a keyboard, a mouse, or other kinds of controllers, which are connected to the computer, or a combination thereof.

Storage 201 stores a program that is read and executed by controller 202. Storage 201 stores data that is received from imaging apparatuses 10A to 10N and to be processed by controller 202. The imaging circumstance information illustrated in FIG. 4 is an example of such data.

Controller 202 reads and executes a program that is stored in storage 201 described above, so as to control imaging apparatuses 10A to 10N described above, process data received from imaging apparatuses 10A to 10N, and control movable object 600 described above. Further, controller 202 performs a process for presenting, to a user, information on the control and the processing, and a process in response to an instruction from a user. One of the processes is the control of capturing synchronized videos by cameras 100 included in imaging apparatuses 10A to 10N.

In addition, event detection and a calibration instruction may be included each as one of the processes. Event detector 202a included in controller 202 is an element that is implemented by controller 202 executing a program for event detection. Calibration instructor 202b included in controller 202 is an element that is implemented by controller 202 executing a program for the calibration instruction.

One of the controls may include control of movement of movable object 600. Movement controller 202c included in controller 202 is an element implemented by controller 202 executing a program for controlling movement of movable object 600. Imaging controller 202d included in controller 202 is an element implemented by controller 202 executing a program for controlling imaging by imaging apparatuses 10A to 10N.

Note that event detector 202a, calibration instructor 202b, movement controller 202c, and imaging controller 202d of controller 202 may be implemented by dedicated circuits that allow, for instance, event detection, calibration instruction, movement control, and imaging control to be carried out. Specifically, controller 202 may be implemented by software or hardware.

Event detector 202a detects occurrence of a predetermined event that can be a reason for performing the calibration on one of cameras 100 included in imaging apparatuses 10A to 10N, based on the imaging circumstance information that is provided from imaging apparatuses 10A to 10N. An event that can be a reason for performing the calibration is an event that causes camera 100 to move or is highly likely to cause camera 100 to move, or an event that is highly likely to allow the calibration to be performed with high accuracy. More specific examples will be described later in description of operation of imaging system 1000. If the occurrence of such an event is detected, event detector 202a determines whether to perform the calibration. If it is determined to perform the calibration, event detector 202a outputs calibration information that indicates the calibration to be performed to calibration instructor 202b, for example. Alternatively, the calibration information may be output to the display apparatus included in user interface 500 to be presented to a user. The calibration information contains, for example, camera 100 that is to perform the calibration (or one of imaging apparatuses 10A to 10N that includes the camera) and details of the event that is the reason for performing the calibration.

Calibration instructor 202b causes camera 100 indicated by the calibration information to perform the calibration, based on the calibration information received from event detector 202a. If the number of cameras indicated by the calibration information is two or more, the order in which cameras 100 perform the calibration may be determined based on, for example, details of the event that is indicated by the calibration information and is the reason for performing the calibration. A specific example of processing performed by calibration instructor 202b is to be described later.

Movement controller 202c performs movement control to cause movable object 600 that includes marker 606 (later described) for use in calibration to move into an imaging area of the imaging apparatus that is to perform calibration. Specifically, in the movement control, movement controller 202c causes movable object 600 to move, so that marker 606 is imaged over the entirety of image sensor 104 included in the imaging apparatus that is to perform calibration. For example, using a result obtained by processing an image captured by the imaging apparatus that is to perform calibration, movement controller 202c causes movable object 600 to move, so that the marker is included in the entire image captured by camera 100.

Imaging controller 202d causes the imaging apparatus that is to perform calibration to image marker 606. Imaging controller 202d causes the imaging apparatus that is to perform calibration to capture an image in a state where the imaging apparatus has at least one of a predetermined focal distance or a predetermined aperture.

Timer 203 is referred to by controller 202 for time keeping in the above processing.

[2-3. Configurations of Three-Dimensional Space Reconstruction Apparatus and Three-Dimensional Space Recognition Apparatus]

Next, referring back to FIG. 2, configurations of three-dimensional space reconstruction apparatus 3000 and three-dimensional space recognition apparatus 4000 are to be described.

Three-dimensional space reconstruction apparatus 3000 is implemented by use of a computer, and includes a storage apparatus and an arithmetic processing unit that are not illustrated. Model generator 302a illustrated in FIG. 2 is an element that is implemented by the arithmetic processing unit executing a program for generating three-dimensional model data (three-dimensional space reconstruction), which is stored in the storage apparatus.

Model generator 302a reconstructs (models) a three-dimensional shape of a subject, based on video data and camera parameters that three-dimensional space reconstruction apparatus 3000 has received from imaging system 1000 and stored in the storage apparatus. Data on a three-dimensional model generated by three-dimensional modeling is stored in the storage apparatus. In addition, the data is transmitted to three-dimensional space recognition apparatus 4000.

Three-dimensional space recognition apparatus 4000 is implemented by use of a computer, and includes a storage apparatus and an arithmetic processing unit that are not illustrated. Viewpoint determiner 402a, renderer 402b, scene analyzer 402c, and tracker 402d illustrated in FIG. 2 are elements that are implemented by the arithmetic processing unit executing a program for three-dimensional space recognition that is stored in the storage apparatus. Depending on the intended use, three-dimensional space recognition apparatus 4000 may not include some of the elements. For example, when three-dimensional space recognition apparatus 4000 is intended to be used to generate a free-viewpoint video, three-dimensional space recognition apparatus 4000 may not include scene analyzer 402c and tracker 402d. When three-dimensional space recognition apparatus 4000 is used as part of a monitoring system, a monitoring system having a higher functionality is achieved by providing three-dimensional space recognition apparatus 4000 with scene analyzer 402c and tracker 402d.

Viewpoint determiner 402a determines a virtual viewpoint onto which a three-dimensional model provided from three-dimensional space reconstruction apparatus 3000 is projected. In the determination, for example, when a video captured at a specific time point from a specific viewpoint is requested from user device 5000, the specific viewpoint is determined as the virtual viewpoint onto which a three-dimensional model is projected. Alternatively, a viewpoint that is set in advance may be determined as the virtual viewpoint onto which a three-dimensional model is projected. As the virtual viewpoint onto which the three-dimensional model is projected, for example, a viewpoint from which a face of a player near a goal is seen from the front in the case of a free-viewpoint video of a sporting event, or a viewpoint from which a face of a person near an entrance is seen from the front in the case of a video obtained by a monitoring apparatus may be determined. A new viewpoint may alternatively be determined as the virtual viewpoint in response to a request from scene analyzer 402c or tracker 402d described later. When the virtual viewpoint is determined, information indicating the determined virtual viewpoint (hereafter, referred to as virtual viewpoint information) is delivered from viewpoint determiner 402a to renderer 402b.

Renderer 402b uses the data on the three-dimensional model received from three-dimensional space reconstruction apparatus 3000, the virtual viewpoint information received from viewpoint determiner 402a, and the video data received from imaging system 1000 to generate a free-viewpoint video. In generating the free-viewpoint video, the three-dimensional model is projected onto the virtual viewpoint indicated by the virtual viewpoint information. At this time, to determine a color and texture of a subject contained in the free-viewpoint video, information on a color and texture of each subject contained in video data captured by an imaging apparatus that is close to the virtual viewpoint is preferentially used. The generated free-viewpoint video may be delivered to scene analyzer 402c or may be distributed to user device 5000 to display the free-viewpoint video. The free-viewpoint video may be alternatively stored in the storage apparatus included in three-dimensional space recognition apparatus 4000 or an external storage apparatus as free-viewpoint video data.

Scene analyzer 402c analyzes data on the three-dimensional model received from three-dimensional space reconstruction apparatus 3000 to identify a subject, for example. A result of the analysis may be delivered to tracker 402d or may be distributed together with the free-viewpoint video to user device 5000 to be displayed on user device 5000. The result may be alternatively stored in the storage apparatus included in three-dimensional space recognition apparatus 4000 or an external storage apparatus as data on the result of analyzing the free-viewpoint video. According to the result of the analysis, scene analyzer 402c may request viewpoint determiner 402a to determine a virtual viewpoint at another time point or from another position.

Tracker 402d tracks a specific subject based on the data on the three-dimensional model received from three-dimensional space reconstruction apparatus 3000. A result of the tracking may be distributed together with the free-viewpoint video to user device 5000 to be displayed on user device 5000. If, for example, the tracking of the specific subject is impossible, tracker 402d may request viewpoint determiner 402a to determine a virtual viewpoint at another time point or from another position.

[2-4. Configuration of User Device]

User device 5000 is an apparatus that includes a communicator and a display not illustrated, such as a television receiver, a personal computer, or a portable terminal. A free-viewpoint video received from three-dimensional space recognition apparatus 4000 via the communicator is displayed on the display of the user device.

User device 5000 may include an input apparatus that is implemented by a touch screen, a track pad, a keyboard, a mouse, a microphone, other kinds of controllers, or a combination thereof. User device 5000 may receive input of a request regarding the three-dimensional space reconstruction or the three-dimensional space recognition from a user via the input apparatus. For example, when input of a request for displaying a video captured at a specific time point from a specific viewpoint is received, this request is transmitted from the communicator of user device 5000 to three-dimensional space recognition apparatus 4000. For example, when a request for displaying a free-viewpoint video of a specific subject is received, this request may be transmitted from the communicator of user device 5000 to three-dimensional space reconstruction apparatus 3000 or three-dimensional space recognition apparatus 4000. For example, when input of a request for designating a specific subject to be tracked is received, this request may be transmitted to three-dimensional space recognition apparatus 4000.

[2-5. Configuration of Movable Object]

Figure 5:
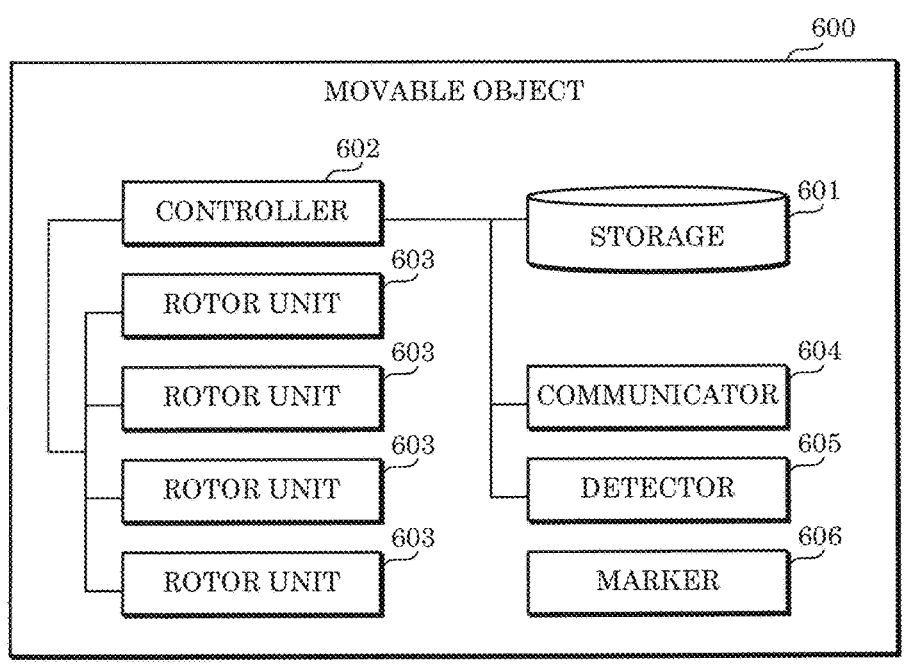
FIG. 5 is a block diagram illustrating a configuration of a movable object in Embodiment 1.

FIG. 5 is a block diagram illustrating a configuration of the movable object in Embodiment 1.

Movable object 600 includes storage 601, controller 602, a plurality of rotor units 603 (four rotor units 603 in the present embodiment), communicator 604, detector 605, and marker 606.

Movable object 600 flies to an imaging area of camera 100 included in at least one of imaging apparatuses 10A to 10N that is to perform calibration, thus moving marker 606 for use in calibration to the imaging area.

Storage 601 stores a program that is read and executed by controller 602.

Controller 602 reads and executes the program stored in storage 601, to control movement according to control information on movement control obtained from control apparatus 200 via communicator 604. Controller 602 controls, for instance, orientation and a direction of movement of movable object 600 in the control of movement of movable object 600, based on the results of detecting the position and orientation of movable object 600, for instance, that are detected by detector 605. Controller 602 is implemented by a computer that includes a central processing unit (CPU), a random access memory (RAM), a read-only memory (ROM), a communication interface, and an input/output (I/O) port, for instance. Note that controller 602 may be implemented by a dedicated circuit that allows movement control. Specifically, controller 602 may be implemented by software or hardware.

Rotor units 603 each include a propeller and a motor that are not illustrated. Rotor units 603 are fixed onto the casing of movable object 600 in an orientation in which the propellers rotate about the rotation axis parallel to the vertical direction. Rotor units 603 can exert upward or downward force relative to the positions of the casing in which rotor units 603 are fixed, by rotating the propellers using the motors in the positions. Rotor units 603 can cause movable object 600 to move in a desired direction by controller 602 controlling, for instance, the rotational speed and the rotational direction of rotor units 603.

Communicator 604 is communicably connected to control apparatus 200 in a wireless manner. Communicator 604 may be a communication interface communicably connected to control apparatus 200 in a wireless manner. For example, communicator 604 may be a wireless local area network (LAN) interface compatible with a standard such as IEEE802.11a, IEEE802.11b, IEEE802.11g, or IEEE802.11n, a wireless-communication interface compatible with the Bluetooth (registered trademark) standard, or a wireless-communication interface compatible with the Zigbee (registered trademark) standard.

Detector 605 detects the position and the orientation of movable object 600. Specifically, detector 605 may include a sensor that detects displacement, acceleration, and tilt, for instance, of movable object 600a, a sensor that perceives geomagnetism in movable object 600, and/or a positioning mechanism that can detect the position of movable object 600 such as a GPS receiver.

Marker 606 has a predetermined size. Specifically, marker 606 has a pattern constituted by repetitions at predetermined intervals in a first direction and a second direction different from each other on a plane. Marker 606 may have a pattern having predetermined intervals mentioned above that can be readily identified from an image captured by camera 100. Marker 606 may have a pattern in which, for example, black squares and white squares are alternately and repeatedly disposed in the first direction and the second direction. Further, marker 606 may have a pattern in which black circles are disposed in a matrix at predetermined intervals in the first direction and the second direction, for example.

Here, information indicating the shape of marker 606 stored in storage 101 of camera 100 is, for example, information indicating the entire size of marker 606. The information may include the lengths of marker 606 in the first direction and the second direction. Further, the information may include the predetermined intervals of the pattern of marker 606.

Note that movable object 600 described above is a so-called drone that includes rotor units 603, yet movable object 600 is not limited to a drone, and may be an airship-type movable object that includes a balloon and rotor units that can produce propulsion or may be a helicopter-type aircraft. Furthermore, movable object 600 is not limited to an unmanned movable object, and may be a manned movable object. Stated differently, movable object 600 may be any type of aircraft as long as movable object 600 is an aircraft whose movement can be controlled in response to an instruction from control apparatus 200. Although movable object 600 is an aircraft, movable object 600 is not limited to an aircraft, and may be an apparatus that moves in the air while being hung, like a Spidercam (registered trademark). Further, movable object 600 may be a ground movable object such as a vehicle.

[2-6. Others]

The configuration of imaging system 1000, the configurations of three-dimensional space reconstruction apparatus 3000 and three-dimensional space recognition apparatus 4000 that use video data and camera parameters received from imaging system 1000, and the configuration of user device 5000 that receives, for instance, a free-viewpoint video from three-dimensional space recognition apparatus 4000 and displays the free-viewpoint video in the present embodiment are described above. Note that these configurations are not limited to those in the above description.

For example, the above has described the case where calibrator 102a in each camera 100 performs the calibration according to the calibration information that is input from control apparatus 200, but this does not limit what performs the calibration. For example, controller 202 of control apparatus 200 may include a consolidated calibrator in imaging system 1000. Calibrator of controller 202 may then obtain and use videos captured by cameras 100 to perform the calibration according to the calibration information from calibration instructor 202b.

In the above configuration, each of control apparatus 200, three-dimensional space reconstruction apparatus 3000, and three-dimensional space recognition apparatus 4000 is described such that the apparatus is implemented by use of a computer, but some or all of these apparatuses may be combined to be mounted in one or more computers.

User interface 500 and user device 5000 may be the same apparatus. That is, similarly to user device 5000, user interface 500 may receive a video distributed from three-dimensional space recognition apparatus 4000, and may display the video to a system administrator. The system administrator can input a request for controlling three-dimensional space reconstruction apparatus 3000 and three-dimensional space recognition apparatus 4000 according to the displayed video if the system administrator is an administrator of the imaging system and at the same time is an administrator of a free-viewpoint video distributing system or a monitoring system that includes three-dimensional space reconstruction apparatus 3000 and three-dimensional space recognition apparatus 4000.

[3. Operation]

Next, operation by imaging system 100 in the present embodiment to achieve the calibration performed at an appropriate time will be described.

Figure 6:
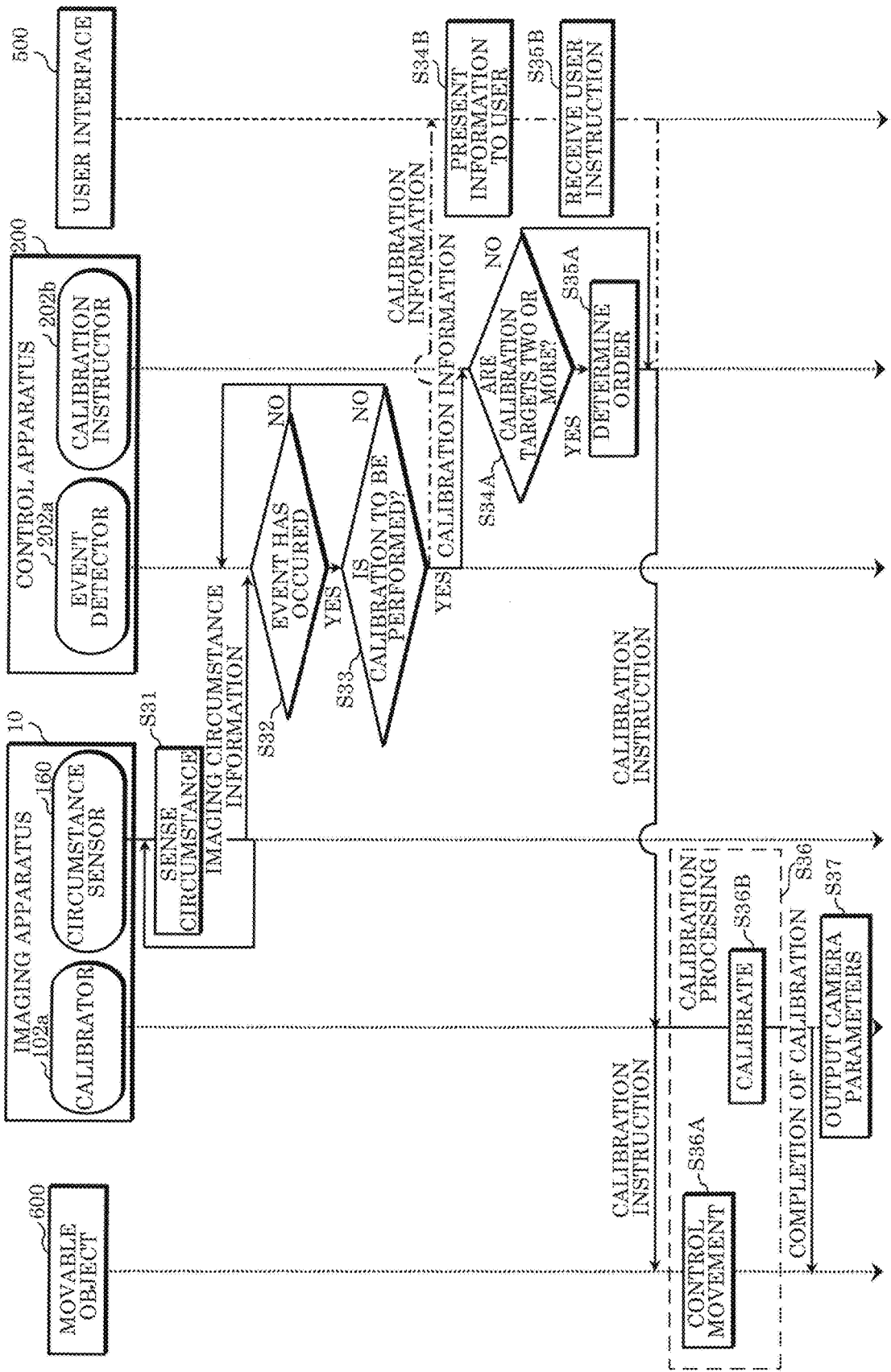
FIG. 6 is a sequence diagram illustrating a series of operations that the imaging system in Embodiment 1 performs.

To perform the calibration at an appropriate time, imaging system 1000 determines whether to perform the calibration when a circumstance about an imaging apparatus or a circumstance of the surrounding of the imaging apparatus (event) change. FIG. 6 is a sequence diagram used to describe a series of operations carried out by imaging system 1000 in the present embodiment, including the determination as to whether the calibration is to be performed. Note that in FIG. 6, imaging apparatus 10 represents any one of imaging apparatuses 10A to 10N illustrated in FIG. 2.

In imaging apparatus 10 during imaging, circumstance sensor 160 senses at least one of a circumstance about camera 100 (or imaging apparatus 10) and a circumstance in the predetermined space including the imaging area of camera 100, all the time or in a predetermined cycle (step S31). The sensed circumstance is output from circumstance sensor 160 as imaging circumstance information and transmitted to control apparatus 200.

In control apparatus 200, event detector 202a detects an occurrence of a predetermined event, based on the received imaging circumstance information (step S32).

The predetermined event is a cause of making current camera parameters no longer accurately indicate a position of camera 100, for instance. Specifically, for example, the event is an event that causes camera 100 to move or an event highly likely to cause camera 100 to move, which are already described in the description of the configuration. Even when camera 100 has not moved, an event that changes an imaging area or an event highly likely to have changed the imaging area may be detected as the predetermined event.

Examples of the imaging circumstance information to be used to detect such events include information on video data output from image sensor 104, information indicating a position, tilt, and shaking of camera 100 that is output from motion sensor 105 or 125. In the case of the video data, for example, a video is analyzed, by which whether the position, for instance, of camera 100 is changed can be estimated based on a change that has occurred in an area that is estimated to be a background area or a change in the size of the background area that occupies in the video.

The imaging circumstance information may be information that is output from operation detector 106 or 126 and indicates a predetermined operation of camera 100 or stand 120. More specifically, the imaging circumstance information indicates a change in a focal distance or exposure of camera 100, switch between on and off of camera 100, and a movement of a pan head of stand 120, for instance. The imaging circumstance information may indicate such operations no matter whether the operations are caused by a manual operation or automatic control of imaging apparatus 10.

The camera parameters may not correctly reflect a state of camera 100 that has performed the predetermined operation. For example, if the focal distance changes, internal parameters also change accordingly. There is a case where a user unintentionally changes a position or an orientation of camera 100 before or after a battery change in which camera 100 is once turned off. As another case, when camera 100 is moved while being off, motion sensor 105 of camera 100 cannot sense this movement. Therefore, after camera 100 is turned on again, the camera parameters of camera 100 that have been used before camera 100 is turned off do not correctly reflect the position and the orientation of camera 100. In addition, operation of rotating or moving vertically the pan head of stand 120 involves change in the position or the orientation of camera 100 (hereafter, may be referred to as operation of camera 100, which also includes operation of stand 120). Accordingly, the accuracy of camera parameters can be maintained by detecting a predetermined operation highly likely to involve change in the state of camera 100 and determining whether to perform the calibration based on the detection.

The imaging circumstance information may be information on sound around imaging apparatus 10, which is output from sound collector 107 or 147.

Event detector 202a detects the occurrence of an event when a change over time indicated by such imaging circumstance information exceeds a predetermined threshold (YES in step S32). This predetermined threshold is an example of a first threshold in the present embodiment.

When the occurrence of an event is detected (YES in step 32), event detector 202a determines whether to perform calibration based on, for example, the magnitude of the change over time indicated by the information (step S33). For example, the predetermined threshold is determined in consideration of the magnitude of an influence of continuously using current camera parameters, on the accuracy of three-dimensional space reconstruction, based on the magnitude of movement of camera 100 indicated by the imaging circumstance information. The determination as to whether to perform the calibration is made based on, for example, whether the change exceeds a predetermined threshold greater than the first threshold. The predetermined threshold greater than the first threshold is an example of a second threshold in the present embodiment.

The predetermined event may be an event highly likely to allow the calibration with high accuracy. For example, calibration that is performed using a video that includes many feature points is likely to provide camera parameters with a higher accuracy (reliability).

Examples of imaging circumstance information used in detecting such an event also include information indicated by video data output from image sensor 104 described above. For example, when feature points are extracted by analyzing a video, and a total number of the extracted feature points is greater than or equal to a predetermined number, it may be determined that the predetermined event has occurred (YES in step S32) and that the calibration is to be performed (YES in step S33).

The predetermined event may be alternatively an event that has less influence on convenience of a user. For example, when a match is in a time period during which the match does not progress in a sporting event, such as halftime, may be detected as an occurrence of the predetermined event. In a ball game, few users pay their attention to a place where neither a ball nor a person is present, and thus a state where an entire imaging area includes neither a ball nor a person may be detected as an occurrence of the predetermined event. In a case of a monitoring system, a state where an imaging area and its surroundings include neither a person nor an automobile may be detected as an occurrence of the predetermined event.

Examples of the imaging circumstance information to be used to detect such events also include the information indicated by video data output from image sensor 104 described above and information on sound around imaging apparatus 10, which is output from sound collector 107 or 147. In the case of video data, for example, if analysis of a video shows that the video includes no image of a predetermined object such as a person, it may be determined that the predetermined event has occurred (YES in step S32) and that the calibration is to be performed (YES in step S33). In the case of the information on sound, whether a game is in progress, whether a whistle is blown, or whether a voice or sound of footsteps of a person, or engine sound or driving sound of an automobile is produced around imaging apparatus 10, for instance, may be determined by analyzing the sound.

In addition, depending on a kind of an operation performed on camera 100, the operation may be determined as occurrence of the predetermined event. This is because, for example, when camera 100 is restarted, a battery is replaced, or a lens is attached or detached, the imaging area of camera 100 is highly likely to be changed. Such events are detected based also on information output from operation detector 106. For example, a battery or a lens is replaced while camera 100 is off, and thus an operation of starting camera 100 occurs before the start of capturing an image. Hence, for example, when event detector 202a receives information that indicates detection of an operation of the start, event detector 202a may determine that the predetermined event has occurred. In subsequent step S33, the calibration may be determined to be performed as an indispensable operation after the start or a determination is made based on another item of imaging circumstance information.

Event detector 202a may detect an occurrence of the predetermined event when a predetermined time has elapsed since previous calibration of camera 100. For example, event detector 202a keeps a log of performing calibration in storage 201, refers to a time indicated by timer 203 included in control apparatus 200 to calculate an elapsed time from the previous calibration, and detects occurrence of the predetermined event when the elapsed time exceeds a predetermined time.

This causes the calibration of camera 100 to be performed with a predetermined frequency or higher. For example, an occasion of updating the camera parameters is ensured when changes that fall below the second threshold that is used to determine whether to perform the calibration are accumulated in camera 100, and camera parameters deviate from the actual state of camera 100 without performing the calibration.

When it is determined that the calibration is not to be performed (NO in step S33), event detector 202a returns to a standby state for receiving the imaging circumstance information.

When it is determined that the calibration is to be performed (YES in step S33), event detector 202a outputs the calibration information.

Figures 7A, 7B, 8:
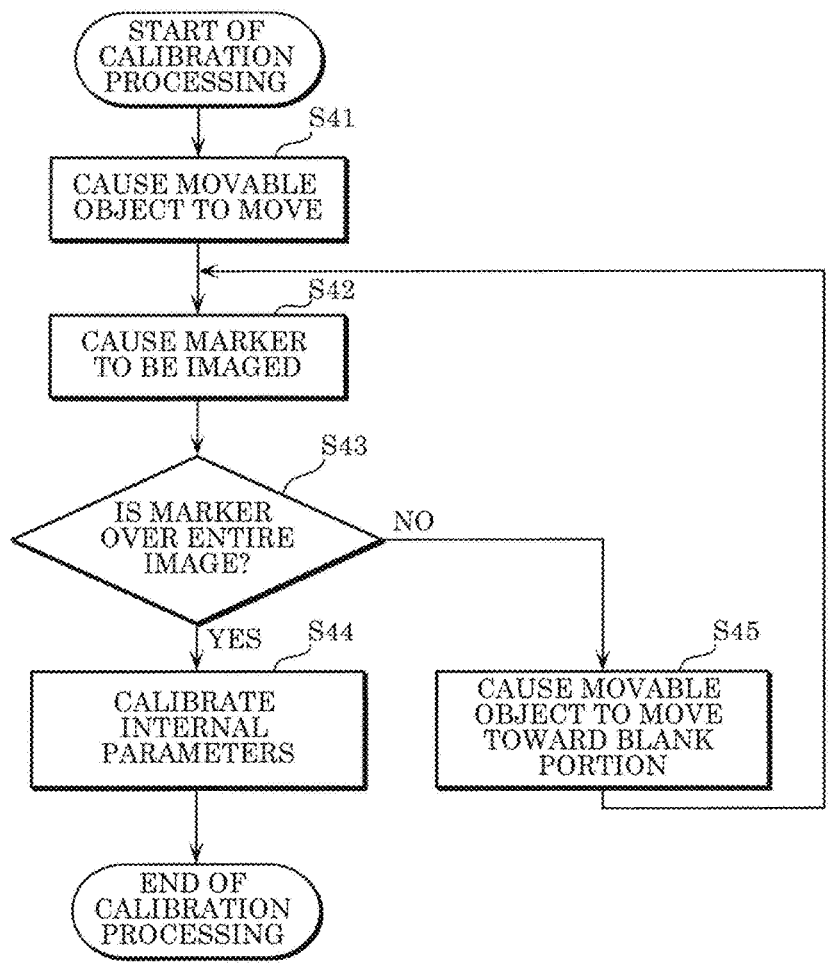
FIG. 7A illustrates an example of a data configuration of calibration information in Embodiment 1.
FIG. 7B illustrates another example of a data configuration of calibration information in Embodiment 1.
FIG. 8 is a flowchart illustrating an example of calibration processing in Embodiment 1.

The calibration information contains information on camera 100 (or imaging apparatus 10 that includes camera 100) which is to be caused to perform the calibration and a reason for determining that the calibration is to be performed (the event described above). FIG. 7A and FIG. 7B each illustrate an example of a data configuration of the calibration information.

In the example illustrated in FIG. 7A, a target which is to be caused to perform the calibration is shown as imaging apparatus 10A, which includes camera 100 that is the target (see "10A" in the column "CALIBRATION TARGET"). In addition, the reason for performing the calibration is shown as "PAN HEAD ROTATED/MOVED" in the column "REASON" together with a reason code of 20. Such calibration information is output when the imaging circumstance information that event detector 202a has received from circumstance sensor 160 of imaging apparatus 10A indicates rotation/movement of the pan head that exceeds the first threshold and the second threshold.

In the example illustrated in FIG. 7B, it is shown that cameras 100 included in all of imaging apparatuses 10 are to be subjected to the camera calibration (see "All" in the column "CALIBRATION TARGET"). In addition, the reason for performing the camera calibration is shown as "HALFTIME DETECTED" in the column "REASON" together with a reason code of 100. Such camera calibration information is output when event detector 202a estimates that halftime of a sport match that is held in a predetermined space that includes an imaging area has started, based on the imaging circumstance information that event detector 202a has received from circumstance sensor 160 of one of imaging apparatuses 10. As described above, depending on details of the detected event, event detector 202a may determine that cameras 100 other than camera 100 included in imaging apparatus 10 which has transmitted the imaging circumstance information are to perform the camera calibration.

The calibration information is input to calibration instructor 202b. Receiving the calibration information, calibration instructor 202b generates a calibration instruction based on contents of the calibration information, and transmits the generated calibration instruction to imaging apparatus 10 that includes camera 100 to which the instruction is directed.

At this time, for example, when plural imaging apparatuses 10 (or two or more cameras 100) are shown in the column "CALIBRATION TARGET" in the calibration information (YES in step S34A) or when a plurality of pieces of calibration information with different contents in the column "CALIBRATION TARGET" are received in a certain period of time, calibration instructor 202b determines the order in which cameras 100 are to perform the calibration (step S35A). Calibration instructor 202b causes cameras 100 to perform the calibration in the determined order. For this purpose, calibration instructor 202b may, for example, transmit the calibration instruction at different times or may designate a time to perform calibration in a calibration instruction.

This order may be determined based on, for example, the details of an event shown in the column "REASON" in the calibration information. The details of an event are, for example, a type of the event. For example, storage 201 stores a table in which priorities of performing the calibration are set in advance for types of events. Alternatively, a table in which priorities of performing the calibration are determined in advance for reason codes with which event detector 202a gives reasons as illustrated in FIG. 7A and FIG. 7B may be stored in storage 201. When receiving a plurality of items of calibration information with different contents in the column "CALIBRATION TARGET", calibration instructor 202b may determine the order in which cameras 100 are to perform the calibration by referring to this table or based on the reason codes (step S35A). A higher priority is set for an event that is highly likely to cause a larger change in imaging area. Different priorities may be set for the same type of events, that is, for example, events of shaking occurrence, depending on the magnitudes thereof.

Alternatively, the order may be determined in advance for each of the types of events. For example, when an event is halftime, the order may be determined such that all cameras 100 perform the calibration simultaneously. In this case, for example, calibration instructor 202b broadcasts the calibration instruction to imaging apparatuses 10A to 10N. Alternatively, to satisfy a demand for generating a free-viewpoint video also during halftime, the order may be determined such that groups of several cameras 100 disposed in the predetermined space alternately perform the calibration or such that certain camera 100 starts the calibration and other cameras 100 perform the calibration sequentially. In this case, calibration instructor 202b determines the order in which cameras 100 are to perform the calibration according to the order determined in advance (step S35A).

This order may be determined based on, for example, the camera parameters of cameras 100 that are calculated by previous calibration performed by calibrator 102a. For example, an imaging area of each camera 100 may be located from the camera parameters of all cameras 100, and the order in which cameras 100 are to perform the calibration may be determined such that camera 100 having an imaging area with a smaller portion that overlaps imaging areas of other cameras 100 is preferentially caused to perform calibration. The order may be alternatively determined based on a target included in the imaging area such that, for example, camera 100 having an imaging area in front of a goal where a scene of a player releasing a shot can be captured is preferentially caused to perform calibration.

Note that "the order of cameras 100 to perform the calibration" described in the present embodiment also includes the case where plural cameras 100 perform the calibration in parallel.

By calibration instructor 202b adjusting and determining the order of cameras 100 to perform the calibration in this manner, it is possible to cause cameras 100 to perform the calibration in the order that is suitable to maintain a state where the three-dimensional space reconstruction is properly performed or the ascending order of influences that cameras 100 exert on the three-dimensional space reconstruction.

The calibration information may be transmitted to user interface 500 to be presented to a user such as a system administrator (step S34B). Based on the information, the user inputs an instruction to cause target camera(s) 100 to perform the calibration, via user interface 500 (RECEIVE INSTRUCTION in step S35B). The input instruction is transmitted to calibrator 102a via calibration instructor 202b. In this case, the order of cameras 100 to perform the calibration may be designated by the user or determined by calibration instructor 202b.

Camera 100 of imaging apparatus 10 and movable object 600 that have received the calibration instruction perform calibration processing (S36). In calibration processing, based on the calibration instruction, movable object 600 performs movement control (S36A), and calibrator 102a of camera 100 performs calibration (step S36). Camera parameters calculated by performing calibration processing are output to three-dimensional space reconstruction apparatus 3000 (step S37).

Next, a specific example of calibration processing is to be described.

FIG. 8 is a flowchart illustrating an example of calibration processing in Embodiment 1. FIG. 9A to FIG. 9D are diagrams for describing details of calibration processing in Embodiment 1.

In calibration processing in the present embodiment, first, movement controller 202c of control apparatus 200 causes movable object 600 that includes marker 606 to move into imaging area A1 of camera 100 of one of imaging apparatuses 10A to 10N that is to be caused to perform calibration (S41). Specifically, when camera 100 of imaging apparatus 10A is to perform calibration, movement controller 202c causes movable object 600 to move towards predetermined imaging area A1 of camera 100 of imaging apparatus 10A. For example, movement controller 202c may cause movable object 600 to move to imaging area A1 by transmitting, to movable object 600, positional information indicating the position of imaging area A1, or may give real-time instructions on the direction in which movable object 600 is to move by obtaining positional information of movable object 600. Movement controller 202c may cause sound collectors 107 and 147 included in imaging apparatus 10A to collect unique sound being emitted by rotor units 603 of movable object 600, and may cause movable object 600 to move in a direction in which the sound increases for imaging apparatus 10A, thus causing movable object 600 to approach imaging area A1. Movement controller 202c obtains a radio field intensity of radio waves that communicator 604 included in movable object 600 uses for wireless communication, thus causing movable object 600 to move in a direction in which the radio field intensity increases for imaging apparatus 10A, thus causing movable object 600 to approach imaging area A1.

Next, imaging controller 202d of control apparatus 200 causes camera 100 to image marker 606 (S42). Specifically, if it is determined that movement controller 202c have caused movable object 600 to approach imaging area A1, imaging controller 202d causes camera 100 to capture an image. Note that if marker 606 is not included in the captured image, movement controller 202c repeats step S41 to perform again processing of causing movable object 600 to approach imaging area A1 of camera 100.

Then, movement controller 202c obtains an image that includes marker 606 and is captured by camera 100, and determines whether marker 606 is included over the entire obtained image (S43).

When movement controller 202c determines that marker 606 is included over the entire image (YES in S43), movement controller 202c transmits information indicating that marker 606 is included over the entire image to imaging apparatus 10A, and the processing proceeds to subsequent step S44.

On the other hand, when movement controller 202c determines that marker 606 is not included over the entire image (NO in S43), movement controller 202c causes movable object 600 to move toward a blank portion of the image (S45). Specifically, by processing the image, movement controller 202c determines the direction towards an area where marker 606 is not included out of imaging area A1 of camera 100, and causes movable object 600 to move in the determined direction.

Figure 9A:
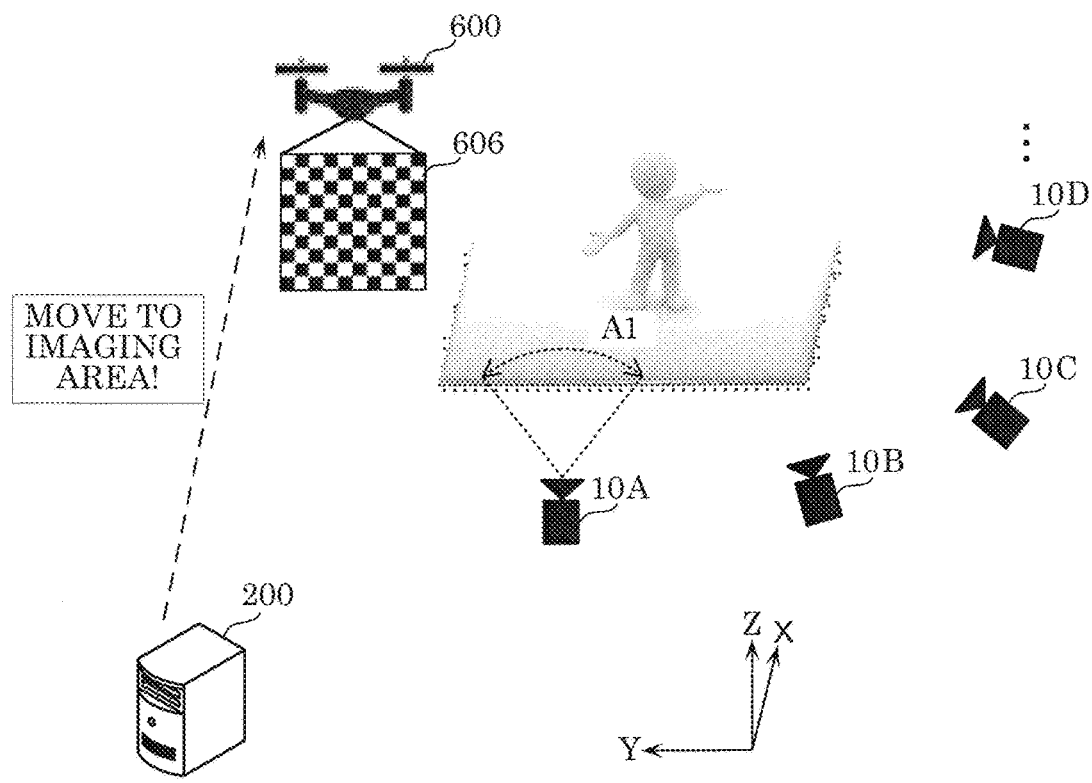
FIG. 9A is a diagram for describing details of calibration processing in Embodiment 1.
Figure 9B:
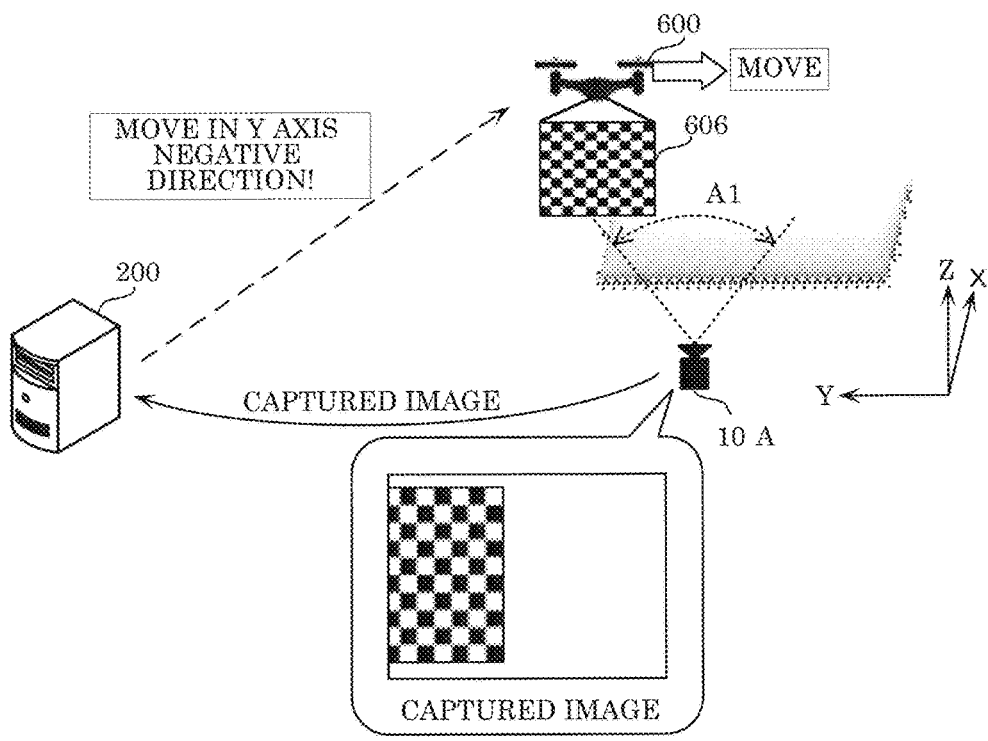
FIG. 9B is a diagram for describing details of calibration processing in Embodiment 1.

For example, as illustrated in FIG. 9B, if marker 606 is included only in about a left half of the captured image that is an image captured by camera 100 of imaging apparatus 10A, movement controller 202c causes movable object 600 to move toward a right area that is a blank area in which marker 606 is not included out of the captured image. In this case, imaging apparatus 10A is facing in the X axis positive direction, and the lateral direction in the captured image is the Y axis direction. Then, the rightward direction in the captured image is the Y axis negative direction. Accordingly, movement controller 202c transmits, to movable object 600, an instruction to cause movable object 600 to move a predetermined distance in the Y axis negative direction. Movable object 600 receives the instruction from movement controller 202c of control apparatus 200, and moves the predetermined distance in the Y axis negative direction.

Upon the end of step S45, the processing returns to step S42. Stated differently, control apparatus 200 repeats processing of steps S42, S43, and S45 until marker 606 is included over the entire image captured by camera 100.

Figures 9C, 9D:
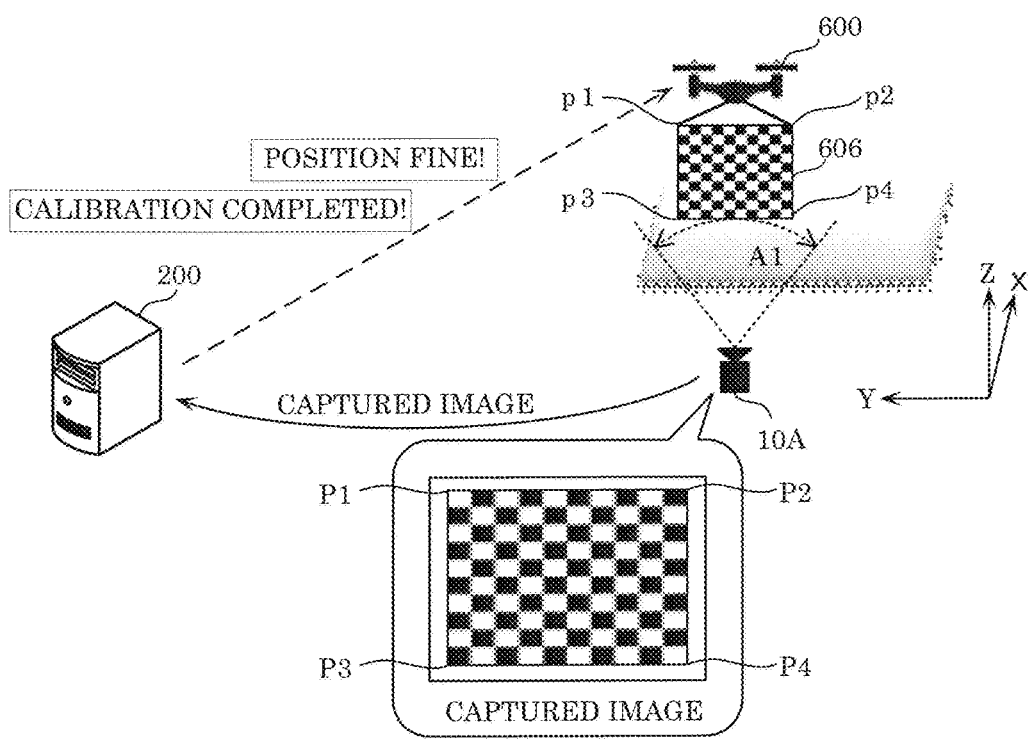
FIG. 9C is a diagram for describing details of calibration processing in Embodiment 1.
FIG. 9D is a diagram for describing details of calibration processing in Embodiment 1.

If imaging apparatus 10A receives information indicating that marker 606 is included over the entire image, calibrator 102a of camera 100 of imaging apparatus 10A calibrates the internal parameters of camera 100, using the image (S44). Specifically, as illustrated in FIG. 9C, if marker 606 is included over the entire captured image obtained by camera 100 of imaging apparatus 10A, movement controller 202c transmits, to imaging apparatus 10A, an instruction for calibrator 102a of camera 100 to calibrate internal parameters using the captured image. Imaging apparatus 10A that has received the instruction calibrates the internal parameters of camera 100 using the captured image, based on the instruction. Upon the end of calibration, movement controller 202c transmits information indicating completion of calibration to movable object 600, and causes movable object 600 to move to a predetermined place.

[4. Method for Calibrating Internal Parameters]

In the present embodiment, camera 100 captures an image of marker 606 having a known size, and the internal parameters of camera 100 are calculated using the captured image, so that the internal parameters of camera 100 are calibrated. Marker 606 has a known size, and is a pattern constituted by repetitions at predetermined intervals in the first direction and the second direction different from each other on a plane. Accordingly, if a relative positional relationship of at least three feature points of marker 606 included in the captured image with three points in marker 606 corresponding to the at least three feature points is identified, the internal parameters of camera 100 that has captured the image can be calculated.

Specifically, marker 606 has a plurality of first feature points. Calibrator 102a obtains information indicating the relative positional relationship of the first feature points, and configures the internal parameters of the imaging apparatus, using the information and a plurality of second feature points that are obtained by processing an image including marker 606, which is captured by camera 100 of the imaging apparatus that is to perform calibration.

For example, as illustrated in FIG. 9C, suppose that four feature points P1 to P4 are extracted from an image captured by camera 100 and including marker 606. In this case, four feature points P1 to P4 are corresponding to, for example, points p1 to p4 at the four corners of marker 606 having a square external shape, and thus three-dimensional coordinates of points p1 to p4 corresponding to feature points P1 to P4 can be obtained as illustrated in FIG. 9D, when a first direction from p1 to p2, a second direction from p1 to p3, and a third direction orthogonal to the first direction and the second direction are used as axes. Furthermore, two-dimensional coordinates of feature points P1 to P4 on the captured image can be obtained from the captured image, and thus as illustrated in FIG. 9D, the three-dimensional coordinates and the two-dimensional coordinates of feature points P1 to P4 can be associated with each other. The internal parameters of camera 100 can be obtained using the results of this association and Expression 1 or 2 indicated below. When there is no distortion on the lens of the camera or when the distortion is so small that the distortion can be ignored, the relation of Expression 1 holds.

[Math. 1]

$$s\begin{bmatrix} u \\ v \\ 1 \end{bmatrix} = \begin{bmatrix} fx & 0 & cx \\ 0 & fy & cy \\ 0 & 0 & 1 \end{bmatrix} \begin{bmatrix} r11 & r12 & r13 & t1 \\ r21 & r22 & r23 & t2 \\ r31 & r32 & r33 & t3 \end{bmatrix} \begin{bmatrix} X \\ Y \\ Z \\ 1 \end{bmatrix} \quad \text{(Expression 1)}$$

Here, s denotes a parameter that indicates the scale of the three-dimensional space.

[Math. 2]

$$\begin{bmatrix} u \\ v \\ 1 \end{bmatrix}$$

The above indicates the two-dimensional coordinates of a point on an image.

[Math. 3]

$$\begin{bmatrix} fx & 0 & cx \\ 0 & fy & cy \\ 0 & 0 & 1 \end{bmatrix}$$

In the above, fx and fy denote parameters that each indicate a focal distance of the camera, and cx and cy denote parameters that indicate the image center of the camera. These indicate internal parameters of the camera.

[Math. 4]

$$\begin{bmatrix} r11 & r12 & r13 & t1 \\ r21 & r22 & r23 & t2 \\ r31 & r32 & r33 & t3 \end{bmatrix}$$

In the above, r11, r12, r13, r21, r22, r23, r31, r32, and r33 denote parameters that indicate the orientation of the camera in a three-dimensional space, and t1, t2, and t3 denote parameters that indicate the position of the camera in a three-dimensional space. These indicate external parameters of the camera.

[Math. 5]

$$\begin{bmatrix} X \\ Y \\ Z \\ 1 \end{bmatrix}$$

The above indicates coordinates of a point in a three-dimensional space.

[Math. 6]

$$s\begin{bmatrix} u \\ v \\ 1 \end{bmatrix} = \begin{bmatrix} fx & 0 & cx \\ 0 & fy & cy \\ 0 & 0 & 1 \end{bmatrix} \begin{bmatrix} x'' \\ y'' \\ 1 \end{bmatrix} \quad \text{(Expression 2)}$$

Here, x" and y" are obtained as shown by Expression 3 below.

[Math. 7]

$$\begin{bmatrix} x \\ y \\ z \end{bmatrix} = \begin{bmatrix} r11 & r12 & r13 & t1 \\ r21 & r22 & r23 & t2 \\ r31 & r32 & r33 & t3 \end{bmatrix} \begin{bmatrix} X \\ Y \\ Z \\ 1 \end{bmatrix}$$ (Expression 3)

$x' = x/z$
$y' = y/z$
$x'' =$
$\quad x'(1 + k_1 r^2 + k_2 r^4 + k_3 r^6) + 2p_1 x' y' + p_2(r^2 + 2x'^2)$
$y'' = y'(1 + k_1 r^2 + k_2 r^4 + k_3 r^6) + p_1(r^2 + 2y'^2) + 2p_2 x' y'$
where $r^2 = x'^2 + y'^2$ Here, $k_1$, $k_2$, $k_3$, $p_1$, and $p_2$ denote parameters that indicate distortion of a lens. Specifically, $k_1$, $k_2$, and $k_3$ denote radial distortion coefficients, and $p_1$ and $p_2$ denote circumferential distortion coefficients. The parameters that indicate such distortion of the lens are also parameters of the internal parameters.

[5. Advantageous Effects and Others]

As described above, in the present embodiment, imaging system 1000 calibrates a parameter of imaging apparatus 10 disposed in a predetermined position. Imaging system 1000 includes movement controller 202c, imaging controller 202d, and calibrator 102a. Movement controller 202c causes movable object 600 to move into imaging area A1 of imaging apparatus 10. Movable object 600 includes marker 606 for use in calibration. Imaging controller 202d causes imaging apparatus 10 to image marker 606. Calibrator 102a calibrates an internal parameter of imaging apparatus 10 using an image that includes marker 606, the image being captured by imaging apparatus 10 imaging marker 606.

According to this, movable object 600 is used to move marker 606 into imaging area A1 of imaging apparatus 10, and imaging apparatus 10 is caused to capture an image of marker 606, so that the internal parameter of imaging apparatus 10 is calibrated. Accordingly, the internal parameter of imaging apparatus 10 can be calibrated without a person bringing marker 606 close to imaging apparatus 10. Thus, the internal parameter of imaging apparatus 10 disposed in a predetermined position can be readily calibrated.

Accordingly, for example, even when imaging apparatus 10 is disposed on a high place, imaging apparatus 10 can be readily caused to image marker 606, and the internal parameter of imaging apparatus 10 can be readily calibrated. Furthermore, a person does not need to check whether imaging apparatus 10 has imaged marker 606, and thus the work speed for calibrating the internal parameter can be increased.

In the present embodiment, movement controller 202c causes movable object 600 to move, to cause marker 606 to be imaged over entirety of image sensor 104 included in imaging apparatus 10.

Accordingly, the internal parameter of imaging apparatus 10 can be effectively calibrated.

In the present embodiment, using a result obtained by processing an image captured by imaging apparatus 10, movement controller 202c causes movable object 600 to move, to include marker 606 over entirety of an image captured by imaging apparatus 10.

Accordingly, the internal parameter of imaging apparatus 10 can be calibrated readily and effectively.

In the present embodiment, imaging controller 202d causes imaging apparatus 10 to capture an image in a state in which imaging apparatus 10 has at least one of a predetermined focal distance or a predetermined aperture.

Accordingly, the internal parameter of imaging apparatus 10 can be effectively calibrated.

In the present embodiment, marker 606 has first feature points. Calibrator 102a obtains information indicating a relative positional relationship of the first feature points. Calibrator 102a calibrates the internal parameter of imaging apparatus 10, using the information and second feature points obtained by processing the image including marker 606 and captured by imaging apparatus 10.

Accordingly, the internal parameter of imaging apparatus 10 can be effectively calibrated.

In the present embodiment, imaging system 1000 includes a plurality of cameras 100, circumstance sensors 160, and event detector 202a.

Cameras 100 capture videos of areas that at least partially overlap one another in a predetermined space, from positions different from one another.

Circumstance sensors 160 sense at least one of circumstances about respective cameras 100 and a circumstance in the predetermined space described above, and output the sensed circumstance as imaging circumstance information.

Based on this imaging circumstance information, event detector 202a detects occurrence of the predetermined event, and when detecting the occurrence of the predetermined event, event detector 202a determines whether to perform the camera calibration. When event detector 202a determines that the camera calibration is to be performed, event detector 202a outputs calibration information indicating that the calibration is to be performed.

Accordingly, it is determined whether performing the calibration is necessary or whether it is an appropriate timing to perform the calibration, based on statuses of cameras 100 while capturing images or a status of a location where images are captured (event). Providing information that indicates the calibration to be performed allows the calibration to be performed on an appropriate target at an appropriate time. In addition, an occasion of update to reflect the actual positions of cameras 100, for instance, on camera parameters is ensured also during imaging. By using the camera parameters that are updated in this manner, a state where the three-dimensional space reconstruction is properly performed is maintained, and as a result, stabilities of accuracy and applicability of the three-dimensional space recognition can be enhanced.

Imaging system 1000 may further include camera calibration instructor 202b that causes cameras 100 to perform the calibration. The calibration information indicates camera(s) 100 that is to perform the calibration, among cameras 100. The output calibration information is input to calibration instructor 202b, and calibration instructor 202b causes camera(s) 100 indicated by the calibration information to perform the calibration.

This enables the calibration based on the calibration information to be performed quickly even on camera 100, for example, disposed in a position that a person cannot readily approach. A state where the three-dimensional space reconstruction is properly performed is thus maintained, and as a result, stabilities of accuracy and applicability of the three-dimensional space recognition are enhanced.

In addition, the calibration information may further indicate details of the predetermined event, the occurrence of which is detected. When the calibration information indicates that there are two or more cameras 100 are to perform the calibration, calibration instructor 202b determines the order in which cameras 100 are to perform the calibration, based on the details of the predetermined event indicated by the calibration information, and causes two or more cameras 100 to perform the calibration in the determined order.

Depending on the circumstance in the predetermined space, there is a case where calibration with high accuracy can be performed quickly by all cameras simultaneously performing the calibration. By determining, in this manner, the order in which cameras 100 are to perform the calibration according to an event that is a reason why the calibration is to be performed, cameras 100 are to perform the calibration in an order that is appropriate for maintaining the state where the three-dimensional space reconstruction is appropriately performed. Note that "the order" also includes the case where cameras 100 perform the calibration in parallel.

Circumstance sensors 160 include image sensors 104 included in respective cameras 100, and the imaging circumstance information output by circumstance sensors 160 may contain videos that are output by image sensors 104. In this case, event detector 202a extracts feature points included in the videos, and when the number of extracted feature points is greater than or equal to the predetermined number, event detector 202a may detect the occurrence of the predetermined event and determine that the calibration is to be performed.

The calibration that is performed using videos that include many feature points is likely to provide camera parameters with higher accuracy (reliability). That is, such a time is an appropriate time to perform the calibration. By using the camera parameters that are obtained by the calibration performed at this time, the three-dimensional space reconstruction is also performed with higher accuracy, and stabilities of the accuracy and applicability of the three-dimensional space recognition are enhanced.

Circumstance sensors 160 include image sensors 104 included in respective cameras 100, and the imaging circumstance information output by circumstance sensors 160 may contain videos that are output by image sensors 104. In this case, event detector 202a determines whether the videos include an image of a predetermined object, and when no image of the predetermined object is included, the occurrence of the predetermined event may be detected, and event detector 202a may determine that the calibration is to be performed.

The predetermined object here indicates the importance of a scene captured by cameras 100 and refers to, for example, a person present in a monitoring zone, or a player or a ball in a ball game. Video data containing no image of such an object is less likely to be used to generate a free-viewpoint video, and thus by causing camera 100 that has generated such video data to perform the calibration, stabilities of the accuracy and applicability of the three-dimensional space recognition for a user are enhanced.

Circumstance sensors 160 may each include at least one of image sensors 104 included in respective cameras 100, motion sensors 105 or 125 that sense changes in position and orientation of respective cameras 100, or sound collectors 107 or 147 that collect sound produced in the predetermined space. The imaging circumstance information output by circumstance sensors 160 may be information output by at least one of image sensors 104, motion sensors 105 or 125, or sound collectors 107 or 147. In this case, event detector 202a may detect occurrence of the predetermined event when the imaging circumstance information indicates a change that exceeds the first threshold, and may determine that the calibration is to be performed when the imaging circumstance information indicates a change that exceeds the second threshold greater than the first threshold.

From the change in the information output from image sensors 104, for instance, it is possible to grasp a change that is highly likely to prevent the camera parameters from reflecting actual states of cameras 100 due to a change in the imaging areas of cameras 100, such as movements of cameras 100. However, if the calibration is performed even when a degree of this change is small, a time of usable video data is reduced, which may rather have an adverse effect on the three-dimensional space reconstruction. In view of this, whether to perform the calibration is determined according to the degree of change in circumstances about cameras 100 or a circumstance in the imaging area. This causes the calibration to be performed if a change has an influence on appropriately performing the three-dimensional space reconstruction, whereas this causes the calibration not to be performed if performing the calibration itself has a greater influence on the three-dimensional space reconstruction than the change in the circumstance. Accordingly, a state where the three-dimensional space reconstruction is appropriately performed is maintained, and as a result, stabilities of the accuracy and applicability of the three-dimensional space recognition are enhanced.

Circumstance sensors 160 may include operation detectors 126 that detect predetermined operations of respective cameras 100, and the imaging circumstance information output by circumstance sensors 160 may be information on the predetermined operations carried out, which is output from operation detectors 126. In this case, event detector 202a may detect occurrence of the predetermined event, based on the information on the predetermined operations carried out, which is indicated as the imaging circumstance information.

This causes the camera parameters to be updated in accordance with the change in states of cameras 100 due to operation of cameras 100 or stands 120, by which a state where the three-dimensional space reconstruction is appropriately performed is maintained, and as a result, stabilities of the accuracy and applicability of the three-dimensional space recognition are enhanced.

Event detector 202a may detect, for each of cameras 100, occurrence of the predetermined event when a predetermined time has elapsed since previous calibration is performed, and may determine that the calibration is to be performed. This causes each camera to perform the calibration with a predetermined frequency or higher. For example, a camera in which changes that are below a threshold for determining that the calibration is to be performed are accumulated is also caused to perform calibration, and an occasion of updating the camera parameters is ensured.

Imaging system 1000 may further include user interface 500 to present information to a user. The calibration information may be presented to a user via user interface 500.

This informs the user of imaging system 1000 which camera 100 is to perform or is performing the calibration, for example. In addition, based on a reason for performing the calibration indicated by the presented calibration information (details of the predetermined event), a user may determine the order in which cameras 100 that are to be subjected to the calibration perform the calibration.

[6. Variation]

[6-1. Variation 1]

In the above embodiment, calibrator 102a is an element included in camera 100, but is not limited thereto and may be an element included in control apparatus 200. Specifically, in this case, control apparatus 200 may calibrate the internal parameters of camera 100, based on a captured image received from camera 100.

[6-2. Variation 2]

In the above embodiment, the internal parameters are parameters calibrated using feature points obtained by imaging marker 606, but are not limited thereto, and may be parameters calibrated using feature points of a predetermined object in imaging area A1 of camera 100.

Embodiment 2

[1. Calibration]

In Embodiment 1 above, movable object 600 is caused to move so that marker 606 is included over a single entire captured image, yet the present embodiment is not limited thereto, and movable object 600 may be caused to move to distribute markers 606 in the images captured by camera 100 at different times. Note that the configuration of imaging system 1000 in Embodiment 2 is the same as that of Embodiment 1, and thus the same numerals are given and a description thereof is omitted. In imaging system 1000 according to Embodiment 2, details of control and processing by control apparatus 200 differ from those in imaging system 1000 according to Embodiment 1, and thus the following describes the processing and control that differ.

Specifically, when a superimposed image is assumed to be generated by superimposing images captured by imaging apparatus 10 at different times and each including the marker, movement controller 202c may cause, using a result obtained by processing an image captured by imaging apparatus 10, movable object 600 to move, to distribute markers 606 over the entirety of the superimposed image. Specifically, using the result obtained by processing an image captured by camera 100, movement controller 202c causes movable object 600 to move to include markers 606 in different areas, among a plurality of areas into which images captured by camera 100 at different times are split. In this case, movement controller 202c causes movable object 600 to move at different times, to include markers 606 in all areas.

Furthermore, using a result obtained by processing an image captured by imaging apparatus 10, movement controller 202c may cause movable object 600 to move to positions in which markers 606 that have sharpness higher than or equal to predetermined sharpness are captured in the images. Stated differently, movement controller 202c may cause movable object 600 to move to positions in which markers 606 included in the images are in focus.

[2. Operation]

Next, calibration processing by imaging system 1000 according to the present embodiment is to be described.

Figure 10:
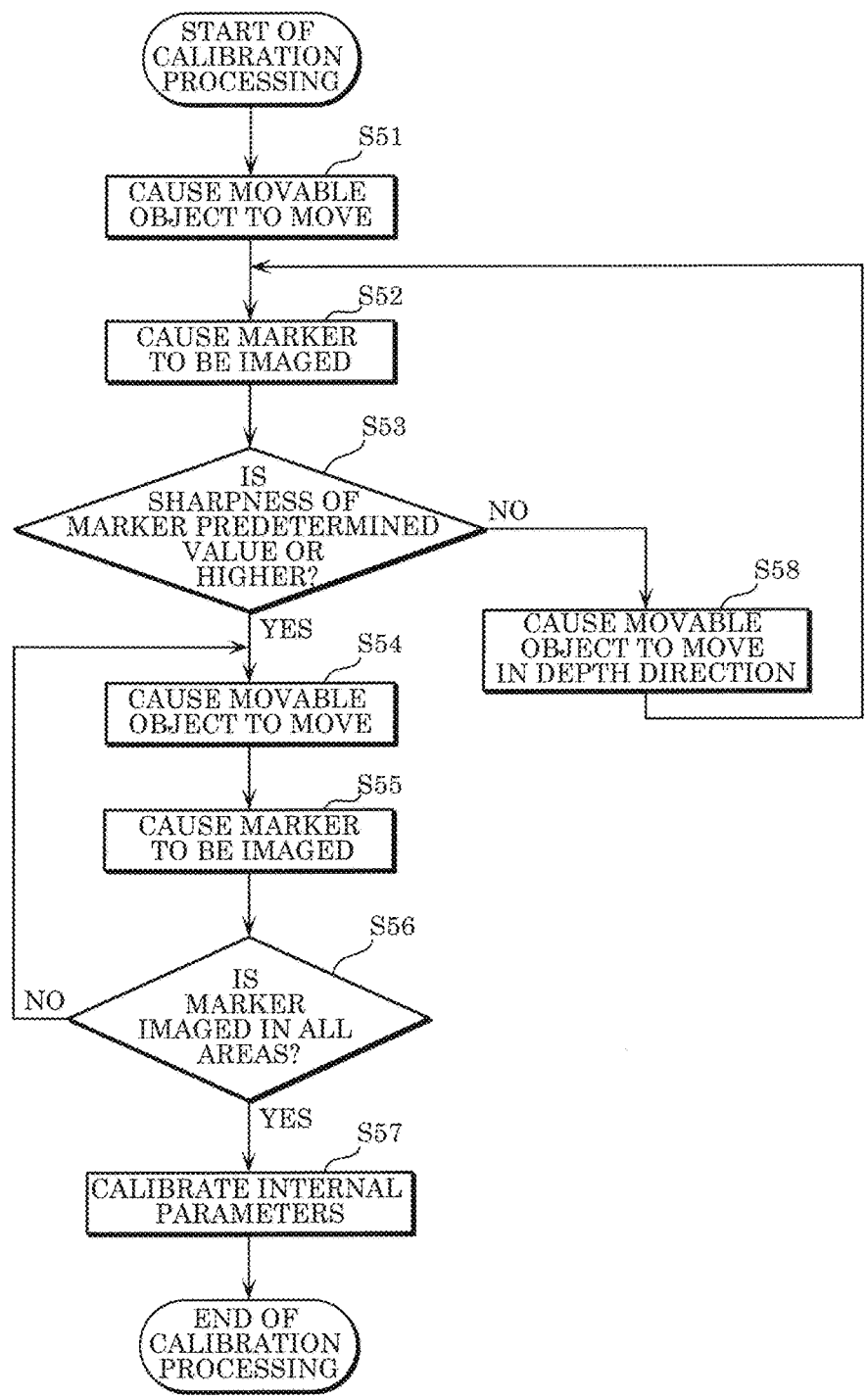
FIG. 10 is a flowchart illustrating an example of calibration processing in Embodiment 2.
Figure 11A:
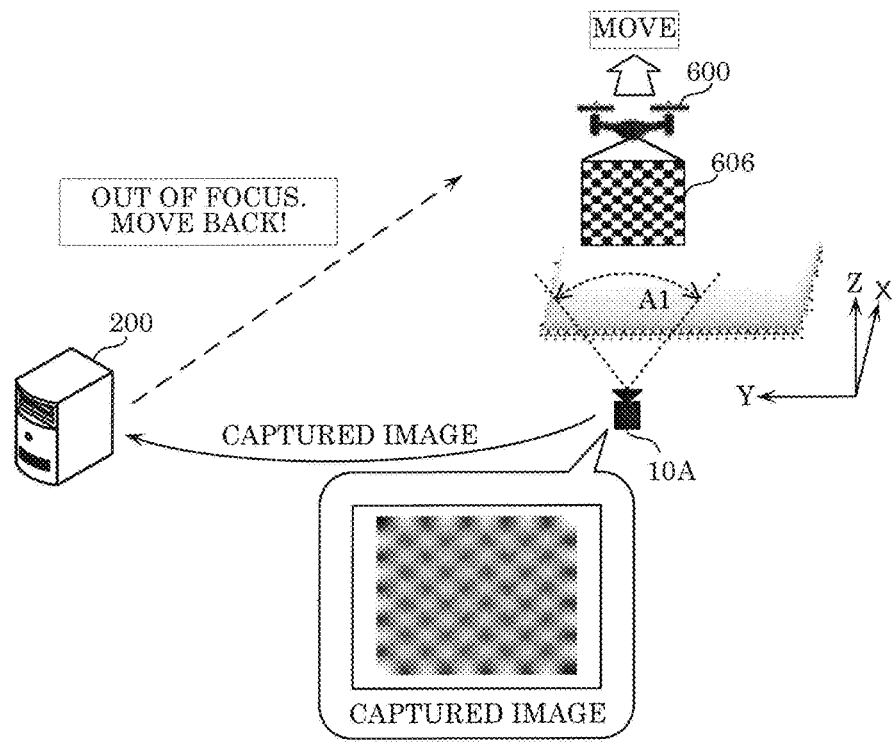
FIG. 11A is a diagram for describing details of calibration processing in Embodiment 2.
Figure 11B:
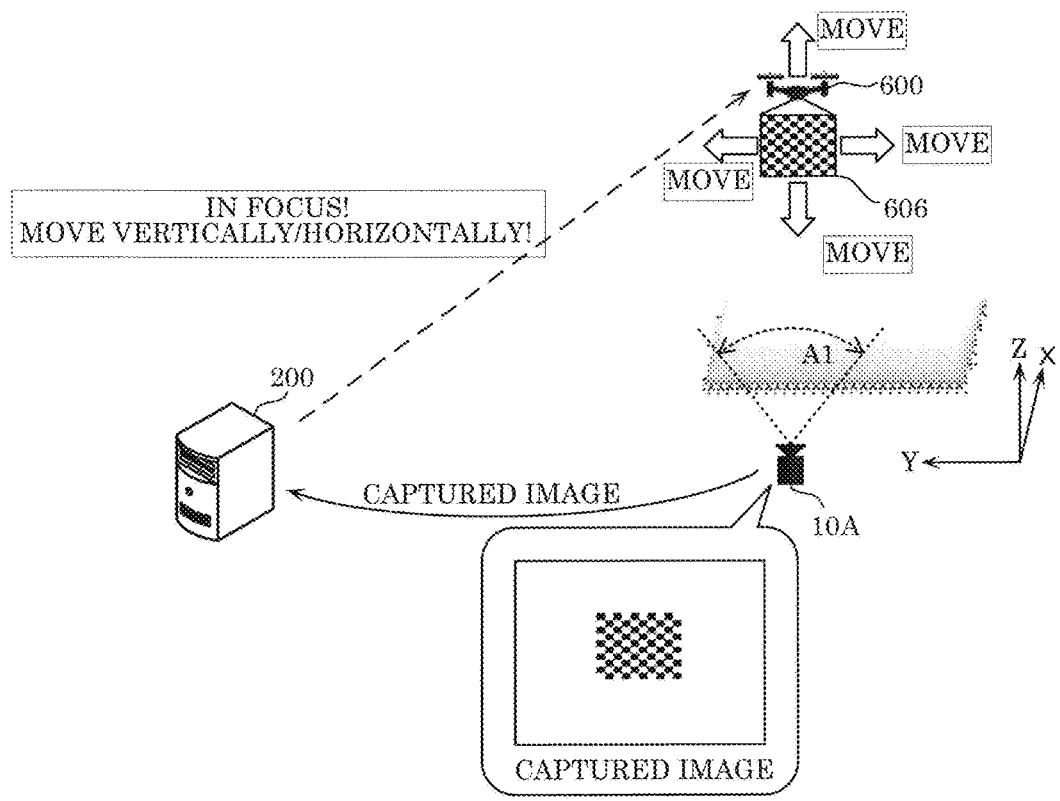
FIG. 11B is a diagram for describing details of calibration processing in Embodiment 2.
Figure 11C:
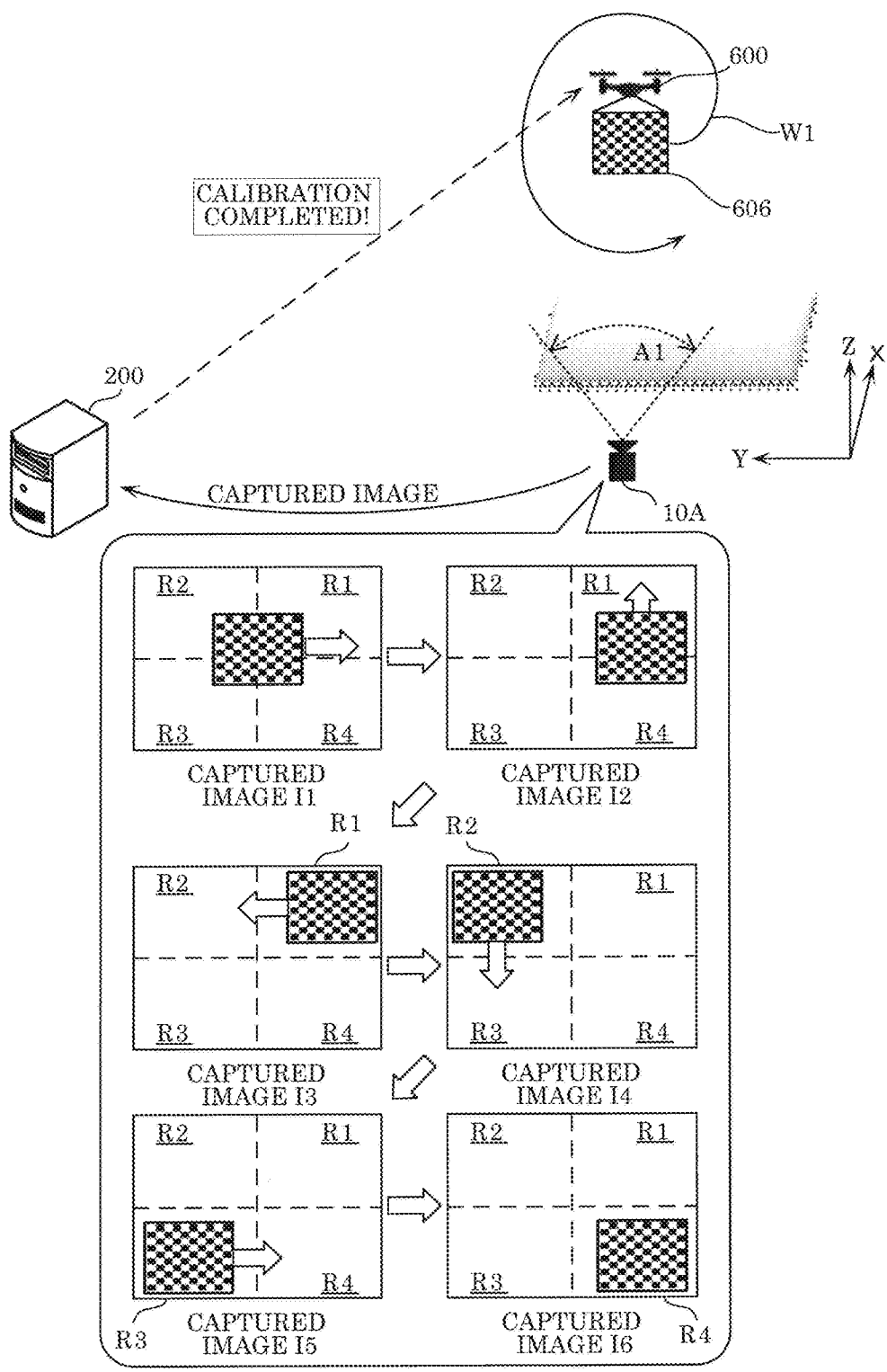
FIG. 11C is a diagram for describing details of calibration processing in Embodiment 2.

FIG. 10 is a flowchart illustrating an example of calibration processing in Embodiment 2. FIG. 11A to FIG. 11C are diagrams for describing details of the calibration processing in Embodiment 2. Specifically, calibration processing in S51 to S58 described below may be performed, instead of the calibration processing described with reference to FIG. 8, and FIG. 9A to FIG. 9C in Embodiment 1.

Steps S51 and S52 are the same as steps S41 and S42 in Embodiment 1, respectively, and thus a description thereof is omitted.

Next, movement controller 202c uses an image captured by camera 100 to determine whether marker 606 included in the image has sharpness higher than or equal to predetermined sharpness (S53). Specifically, movement controller 202c processes the image to calculate the sharpness of marker 606 that appears in the image. Then, movement controller 202c determines whether the calculated sharpness of marker 606 is higher than or equal to the predetermined sharpness.

When movement controller 202c has determined that marker 606 included in the image has sharpness higher than or equal to the predetermined sharpness (YES in S53), the processing proceeds to subsequent step S54.

On the other hand, when movement controller 202c has determined that marker 606 included in the image captured by cameras 100 has sharpness lower than the predetermined sharpness (NO in S53), movement controller 202c causes movable object 600 to move in the depth direction of camera 100 (S58). For example, in this case, movement controller 202c determines that camera 100 is not focused on marker 606, and causes movable object 600 to move a predetermined distance in the depth direction that is a direction parallel to the optical axis of imaging apparatus 10A, as illustrated in FIG. 11A. The depth direction is the X axis positive direction, for example. Note that movement controller 202c may cause movable object 600 to move in the X axis negative direction. In this manner, movement controller 202c causes movable object 600 to move along the optical axis of imaging apparatus 10A, thus bringing movable object 600 close to the position in which camera 100 of imaging apparatus 10A is focused on movable object 600.

After step S58 ends, the processing returns to step S52. Specifically, control apparatus 200 repeats processing of steps S52, S53, and S58 until marker 606 is in focus in an image captured by camera 100.

If control apparatus 200 has determined through the processes that marker 606 is in focus in an image captured by camera 100 as illustrated in 11B, the processing proceeds to step S54, and control apparatus 200 causes movable object 600 to move. Specifically, movement controller 202c causes movable object 600 to move to include markers 606 in different areas, among a plurality of areas into which images captured by camera 100 of imaging apparatus 10A at different times are split.

Then, imaging controller 202d causes camera 100 of imaging apparatus 10A to capture an image when movable object 600 is caused to move (S55).

Movement controller 202c determines, for each of all the split areas, whether the marker is imaged across the entire split area (S56).

When movement controller 202c has determined, for each of all the split areas, that the marker is imaged over the entire split area (YES in S56), movement controller 202c causes calibrator 102a of camera 100 of imaging apparatus 10A to calibrate the internal parameters of camera 100, using captured images each obtained by capturing a marker over entirety of one split area (S57).

On the other hand, when movement controller 202c has determined that the marker is not imaged over at least one of all the split areas (NO in S56), the processing returns to step S54. Specifically, control apparatus 200 repeats processing of steps S54 to S56 until the marker is imaged over each of all the split areas.

For example, as illustrated in FIG. 11C, consider the case where captured images I1 to I6 obtained at different times are each split into four areas, namely, first area R1, second area R2, third area R3, and fourth area R4. In this case, movement controller 202c first causes movable object 600 to move in the Y axis negative direction so that marker 606 is imaged over entire first area R1, and thereafter causes movable object 600 to move in the Z axis positive direction. At this time, controller 202 repeats processing of steps S54 to S56 until marker 606 is imaged over the entirety of all first area R1, second area R2, third area R3, and fourth area R4 into which the images are split, and thus camera 100 is to periodically capture images.

Note that when movement controller 202c determines, by processing captured image I2, that marker 606 is imaged on a right edge portion, movement controller 202c may perform control to change the travel direction of movable object 600. Specifically, in this case, movement controller 202c causes movable object 600 to move in the Z axis positive direction after captured image I2 is obtained.

If marker 606 is imaged over entire first area R1 as shown in captured image I3, movement controller 202c causes movable object 600 to move in the Y axis positive direction. Next, if marker 606 is imaged over entire second area R2 as shown by captured image I4, movement controller 202c causes movable object 600 to move in the Z axis negative direction. Next, if marker 606 is imaged over the entire third area as shown by captured image I5, movement controller 202c causes movable object 600 to move in the Y axis negative direction. Accordingly, movable object 600 is caused to move in a circle along counter-clockwise flight path W1 when viewed from the negative side of the X axis.

[3. Advantageous Effects and Others]

As described above, in the present embodiment, when a superimposed image is assumed to be generated by superimposing images captured by imaging apparatus 10 at different times and each including marker 606, movement controller 202c causes, using a result obtained by processing an image captured by imaging apparatus 10, movable object 600 to move, to distribute markers 606 over entirety of the superimposed image.

Accordingly, the internal parameters of the imaging apparatus can be calibrated effectively.

In the present embodiment, using a result obtained by processing an image captured by imaging apparatus 10, movement controller 202c causes the movable object to move to positions in which markers 606 that have sharpness higher than or equal to predetermined sharpness are captured in images captured by imaging apparatus 10 at different times.

Accordingly, the internal parameters are calibrated using captured images in each of which marker 606 is imaged in focus, and thus two-dimensional coordinates of feature points and three-dimensional coordinates can be extracted accurately. Accordingly, the internal parameters of the imaging apparatus can be accurately calibrated.

[4. Variation]

[4-1. Variation 1]

Figure 12:
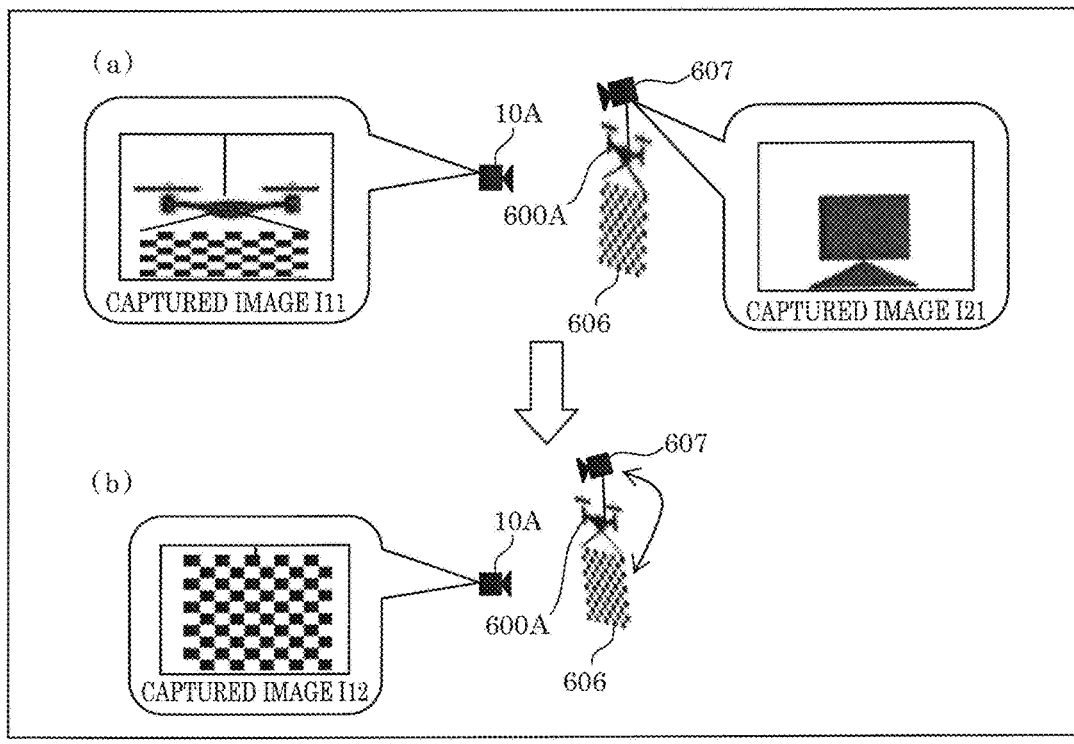
FIG. 12 is a diagram for describing calibration processing in a variation.

Movable object 600 according to Embodiments 1 and 2 above may be further configured to include camera 607 that images the surrounding. For example, as illustrated in FIG. 12, movable object 600A includes camera 607 that captures an image in front of marker 606. In this case, as illustrated in (a) of FIG. 12, movable object 600A approaches imaging apparatus 10A, so that imaging apparatus 10A that is to be caused to perform calibration appears in captured image I21 obtained by camera 607. The position in which camera 607 is disposed is fixed in advance relative to the body of the movable object, and thus in which direction movable object 600A is to be caused to move in order that camera 100 of imaging apparatus 10A captures marker 606 over the entirety as illustrated in captured image I12 of (b) of FIG. 12 can be determined by performing predetermined image processing on captured image I21. The predetermined image processing allows the position and orientation of imaging apparatus 10A to be estimated from, for instance, the size and the shape of imaging apparatus 10A in captured image I21. Such movement control using camera 607 of movable object 600A may be performed by movable object 600A or may be performed by control apparatus 200. Note that information indicating the positional relationship between camera 607 and marker 606 may be notified to calibrator 102a of imaging apparatus 10A.

[4-2. Variation 2]

In Embodiments 1 and 2 above, movable object 600 moves in a state where marker 606 disposed separately from the body of the movable object is suspended, but the embodiments are not limited thereto and a configuration may be adopted in which the body of the movable object itself has the shape and/or the pattern of the marker.

Figure 13:
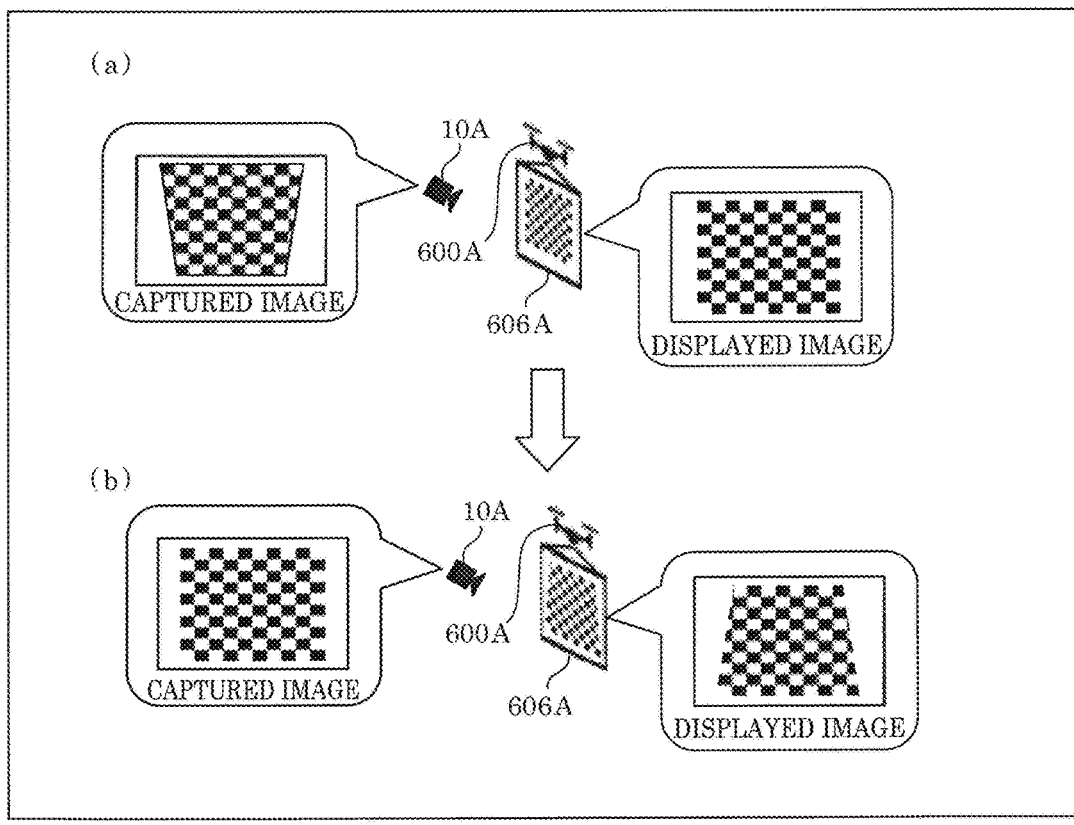
FIG. 13 is a diagram for describing calibration processing in a variation.

As illustrated in FIG. 13, movable object 600B that includes a display apparatus such as a liquid crystal display or an organic electro luminescent (EL) display, as marker 606A. Specifically, marker 606A is the shape and/or the pattern displayed on the display apparatus. As illustrated in (a) of FIG. 13, when marker 606A included in a captured image obtained by the camera of imaging apparatus 10A is tilted and thus displayed in a trapezoid, the shape of marker 606A displayed on the display apparatus may be corrected. Specifically, as illustrated in (b) of FIG. 13, the shape of marker 606A displayed on the display apparatus may be changed into a shape such as a trapezoid so that the shape of marker 606A included in a captured image obtained by the camera of imaging apparatus 10A is rectangular or square. In this manner, the shape of marker 606A displayed on the display apparatus is adjusted so that camera 100 of imaging apparatus 10A can be caused to image marker 606A to include marker 606A over the entire captured image obtained by camera 100 of imaging apparatus 10A.

In this case, a video of advertisement or a video of a match, for instance, may be displayed on the display apparatus when the marker is not displayed on the display apparatus. Furthermore, a video of advertisement or a video of a match, for instance, displayed on the display apparatus may be used as a marker.

[4-3. Variation 3]

Movable object 600 in Embodiments 1 and 2 above may be configured to have a maintenance function for camera 100. For example, movable object 600 may include a lens cleaner to wipe off dirt on the lens of camera 100. In addition, movable object 600 may be provided with functions such as replacing a component of camera 100, locating a damaged portion, and fixing the located damaged portion.

Embodiment 3

Calibration processing described in Embodiments 1 and 2 may be performed as described below.

Figure 14:
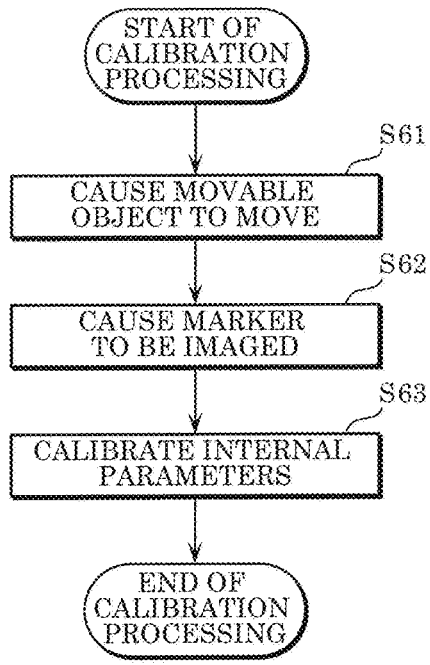
FIG. 14 is a flowchart illustrating an example of calibration processing in Embodiment 3.

FIG. 14 is a flowchart illustrating an example of calibration processing in Embodiment 3.

In the calibration processing in the present embodiment, first, movement controller 202c of control apparatus 200 causes movable object 600 that includes marker 606 to move into imaging area A1 of camera 100 of one of imaging apparatuses 10A to 10N that is to be calibrated (S61).

Next, imaging controller 202d of control apparatus 200 causes camera 100 to image marker 606 (S62).

Calibrator 102a of camera 100 of imaging apparatus 10A calibrates internal parameters of camera 100 using the image (S63).

According to this, movable object 600 is used to move marker 606 into imaging area A1 of camera 100, and camera 100 is caused to image marker 606, thus calibrating the internal parameters of camera 100. Thus, the internal parameters of camera 100 can be calibrated without a person bringing camera 100 in front of marker 606. Accordingly, the internal parameters of camera 100 disposed in a predetermined position can be readily calibrated.

Embodiment 4

Other application examples of the configurations of the image processing method and apparatus described in each embodiment described above and a system using the application examples will be described. The system is applicable to an increasingly intelligent video system with object space extending to a wider area. For example, the system is applicable to (1) a monitoring system mounted in a security camera of a store or a factory, a vehicle-mounted camera of the police or the like, (2) a transportation information system using a camera owned by an individual person, each vehicle-mounted camera, a camera installed in a road or the like, (3) an environmental research or delivery system using a remote-controllable or auto-controllable apparatus such as a drone, and (4) a content transmission and reception system of a video or the like using a camera installed in an entertainment facility, a stadium or the like, a moving camera such as a drone, a camera owned by an individual person or the like.

Figure 15:
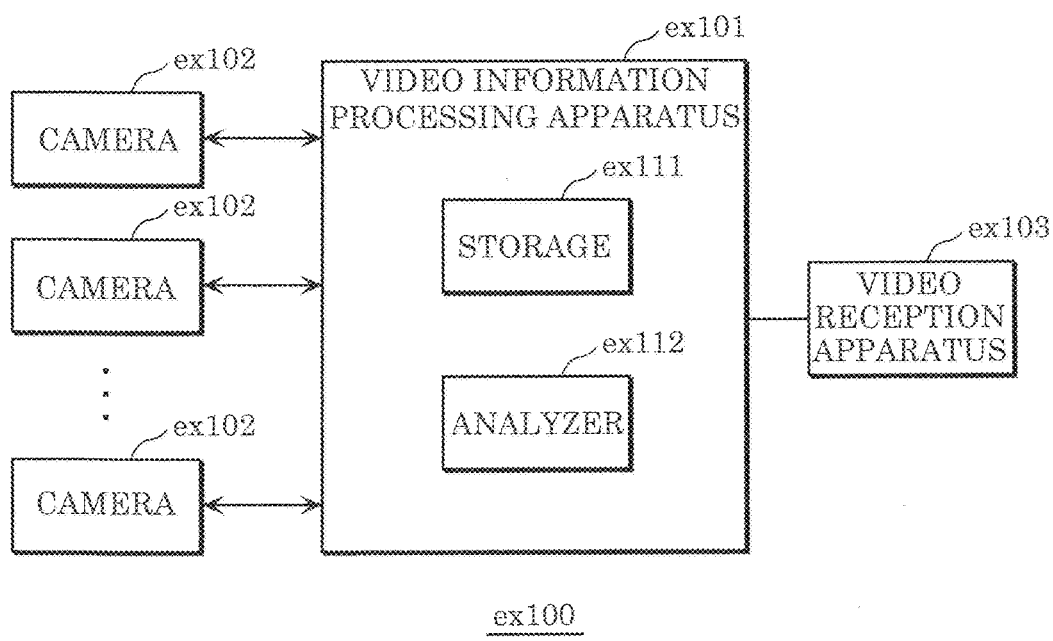
FIG. 15 illustrates a configuration of a video information processing system.

FIG. 15 is a diagram illustrating a configuration of video information processing system ex100 according to the present embodiment. The present embodiment describes an example of preventing occurrence of a blind spot and an example of prohibiting capturing of a specific area.

Video information processing system ex100 illustrated in FIG. 15 includes video information processing apparatus ex101, a plurality of cameras ex102, and video reception apparatus ex103. Note that video information processing system ex100 does not necessarily need to include video reception apparatus ex103.

Video information processing apparatus ex101 includes storage ex111 and analyzer ex112. Each of N cameras ex102 has a function of capturing videos and a function of transmitting captured video data to video information processing apparatus ex101. Moreover, camera ex102 may have a function of displaying a video that is being captured. Note that camera ex102 may code a captured video signal by using a coding scheme such as HEVC or H.264, and may then transmit the coded video signal to video information processing apparatus ex101, or camera ex102 may transmit the video data that is not coded to video information processing apparatus ex101.

Here, each camera ex102 is a fixed camera such as a monitoring camera, a moving camera mounted in a radio-controlled unmanned flight vehicle, a vehicle or the like, or a user camera owned by a user.

The moving camera receives an instruction signal transmitted from video information processing apparatus ex101, and changes a position or capturing direction of the moving camera itself in response to the received instruction signal.

Moreover, time of the plurality of cameras ex102 is calibrated by using time information of a server or a reference camera prior to start of capturing. Moreover, spatial positions of the plurality of cameras ex102 are calibrated based on how an object in space to be captured is captured or a relative position from a reference camera.

Storage ex111 in information processing apparatus ex101 stores the video data transmitted from N cameras ex102.

Analyzer ex112 detects a blind spot from the video data stored in storage ex111, and transmits to the moving camera the instruction signal that indicates an instruction to the moving camera for preventing occurrence of a blind spot. The moving camera moves in response to the instruction signal, and continues capturing.

Analyzer ex112 detects a blind spot by using Structure from Motion (SfM), for example. SfM is a technique of restoring a three-dimensional shape of a subject from a plurality of videos captured from different positions, and SfM is widely known as a shape restoration technology of estimating a subject shape and a camera position simultaneously. For example, analyzer ex112 restores the three-dimensional shape in the facility or in the stadium from the video data stored in storage ex111 by using SfM, and detects as a blind spot an area that cannot be restored.

Note that when the position and capturing direction of camera ex102 are fixed and information of the position and capturing direction is known, analyzer ex112 may perform SfM by using these pieces of known information. Moreover, when the position and capturing direction of the moving camera can be acquired with, for example, a GPS and angle sensor in the moving camera, the moving camera may transmit information of the position and capturing direction of the moving camera to analyzer ex112, and analyzer ex112 may perform SfM by using the transmitted information of the position and the capturing direction.

Note that a method for detecting a blind spot is not limited to the above-described method using SfM. For example, analyzer ex112 may use information from a depth sensor such as a laser range finder, to know a spatial distance of the object to be captured. Moreover, when an image includes a marker that is set in space in advance or a specific object, analyzer ex112 may detect information of the camera position, capturing direction, and zoom magnification from the size of the marker or the object. Thus, analyzer ex112 detects a blind spot by using any method that enables detection of the imaging area of each camera. Moreover, analyzer ex112 may acquire, for example, information of a mutual positional relationship between a plurality of objects to be captured, from video data or a proximity sensor, and analyzer ex112 may identify an area where a blind spot is highly likely to occur, based on the acquired positional relationship.

Here, the blind spot includes not only a portion having no video in an area to be captured but also a portion having poor image quality as compared to other portions, and a portion having no predetermined image quality. This portion to be detected may be set appropriately according to the configuration or purpose of the system. For example, required image quality of a specific subject in space to be captured may be set high. Moreover, conversely, the required image quality of a specific area in space to be captured may be set low, and the required image quality may be set such that the area is not determined to be a blind spot even when no video is captured.

Note that the above-described image quality includes various pieces of information regarding a video, such as area occupied by a subject to be captured in the video (for example, a number of pixels), or whether the video is focused on the subject to be captured. Based on these pieces of information or combination thereof, whether the area is a blind spot may be determined.

Note that detection of the area that is actually a blind spot is described above, but the area that needs to be detected in order to prevent occurrence of a blind spot is not limited to the area that is actually a blind spot. For example, when a plurality of objects to be captured exists and at least part of the objects is moving, a new blind spot is likely to occur because another object to be captured enters between a certain object to be captured and a camera. Meanwhile, analyzer ex112 may detect movement of the plurality of objects to be captured from, for example, the captured video data, and analyzer ex112 may estimate the area that is likely to become a new blind spot, based on the detected movement of the plurality of objects to be captured and positional information of camera ex102. In this case, video information processing apparatus ex101 may transmit the instruction signal to the moving camera to capture the area that is likely to become a blind spot, and video information processing apparatus ex101 may prevent occurrence of a blind spot.

Note that when there is a plurality of moving cameras, video information processing apparatus ex101 needs to select any of the moving cameras to which the instruction signal is to be transmitted in order to cause the moving camera to capture a blind spot or an area that is likely to become a blind spot. Moreover, when there is a plurality of moving cameras and there is a plurality of blind spots or areas that are likely to become blind spots, video information processing apparatus ex101 needs to determine which blind spot or area that is likely to become a blind spot each of the plurality of moving cameras is to capture. For example, video information processing apparatus ex101 selects the moving camera closest to a blind spot or an area that is likely to become a blind spot, based on a position of a blind spot or an area that is likely to become a blind spot, and a position of an area each moving camera is capturing. Moreover, video information processing apparatus ex101 may determine for each camera whether a new blind spot occurs when video data which the moving camera is currently capturing is not obtained, and video information processing apparatus ex101 may select the moving camera that is determined that a blind spot does not occur even when the video data which is currently being captured is not obtained.

The above-described configuration enables video information processing apparatus ex101 to prevent occurrence of a blind spot by detecting a blind spot and transmitting the instruction signal to the moving camera so as to prevent the blind spot.

Variation 1

Note that the example of transmitting the instruction signal for instructing the moving camera to move is described above; however, the instruction signal may be a signal for instructing the user of the user camera to move. For example, the user camera displays an instruction image that instructs the user to change the direction of the camera, based on the instruction signal. Note that the user camera may display the instruction image that indicates a movement path on a map, as the user movement instruction. Moreover, in order to improve the quality of the acquired image, the user camera may display detailed capturing instructions such as the capturing direction, an angle, an angle of view, image quality, and movement of the imaging area. Further, video information processing apparatus ex101 may automatically control such feature data of camera ex102 regarding capturing when the feature data is controllable on a video information processing apparatus ex101 side.

Here, the user camera is, for example, a smartphone, a tablet terminal, a wearable terminal, or a head mounted display (HMD) that a spectator in the stadium or a guard in the facility carries.

Moreover, a display terminal that displays the instruction image does not need to be identical to the user camera that captures video data. For example, the user camera may transmit the instruction signal or the instruction image to the display terminal associated with the user camera in advance, and the display terminal may display the instruction image.

Moreover, information of the display terminal corresponding to the user camera may be registered in video information processing apparatus ex101 in advance. In this case, video information processing apparatus ex101 may cause the display terminal to display the instruction image by transmitting the instruction signal directly to the display terminal corresponding to the user camera.

Variation 2

Analyzer ex112 may generate a free viewpoint video (three-dimensional reconfiguration data), for example, by using SfM to restore the three-dimensional shape in the facility or in the stadium from the video data stored in storage ex111. This free viewpoint video is stored in storage ex111. Video information processing apparatus ex101 reads from storage ex111 the video data according to visual field information (and/or viewpoint information) transmitted from video reception apparatus ex103, and transmits the read video data to video reception apparatus ex103. Note that video reception apparatus ex103 may be one of the plurality of cameras.

Variation 3

Video information processing apparatus ex101 may detect a capturing prohibited area. In this case, analyzer ex112 analyzes the captured image, and when the moving camera is capturing the capturing prohibited area, analyzer ex112 transmits a capturing prohibition signal to the moving camera. The moving camera stops capturing while receiving the capturing prohibition signal.

For example, analyzer ex112 matches three-dimensional virtual space restored by using SfM with the captured video, and accordingly analyzer ex112 determines whether the moving camera set in advance in space is capturing the capturing prohibited area. Alternatively, analyzer ex112 determines whether the moving camera is capturing the capturing prohibited area, by using a marker or characteristic object placed in space as a trigger. The capturing prohibited area is, for example, a rest room in the facility or in the stadium.

Moreover, when the user camera is capturing the capturing prohibited area, the user camera may notify the user of a fact that the current place is a capturing prohibited place, by causing a display connected wirelessly or with wires to display a message, or by outputting a sound or voice from a speaker or an earphone.

For example, a fact that capturing in the current direction of the camera orientation is prohibited is displayed as the message. Alternatively, the capturing prohibited area and the current imaging area are indicated on a displayed map. Moreover, the capturing is automatically resumed, for example, when the capturing prohibition signal is no longer output. Moreover, the capturing may be resumed when the capturing prohibition signal is not output and the user performs operations for resuming the capturing. Moreover, when the capturing is stopped and resumed twice or more in a short period, calibration may be performed again. Moreover, notification for checking the current position or for prompting movement may be given to the user.

Moreover, in a case of special work such as the police, pass code or fingerprint authentication or the like that disables such a function may be used for recording. Further, even in such a case, when the video of the capturing prohibited area is displayed or stored outside, image processing such as mosaic may be performed automatically.

The above configuration enables video information processing apparatus ex101 to set a certain area as the capturing prohibited area by performing determination of capturing prohibition and giving the user notification for stopping capturing.

Variation 4

Since it is necessary to collect videos of the plurality of viewpoints in order to construct three-dimensional virtual space from the videos, video information processing system ex100 sets an incentive for a user who transmits a captured video. For example, video information processing apparatus ex101 distributes videos with no charge or at discount rate to the user that transmits a video, or gives the user who transmits a video a point having a monetary value that can be used in an online or off-line store or in a game, or a point having a non-monetary value such as a social status in virtual space such as a game. Moreover, video information processing apparatus ex101 gives a particularly high point to the user who transmits the captured video of a valuable visual field (and/or viewpoint) such as a frequently requested video.

Variation 5

Video information processing apparatus ex101 may transmit additional information to the user camera based on an analysis result made by analyzer ex112. In this case, the user camera superimposes the additional information of the captured video, and displays the superimposed video on a screen. The additional information is, for example, information of a player such as a player name or height when a game in a stadium is captured, and the player name or a photograph of the player's face is displayed in association with each player in the video. Note that video information processing apparatus ex101 may extract the additional information by search via the Internet based on part or all areas of the video data. Moreover, camera ex102 may receive such additional information by the near field communication including Bluetooth (registered trademark) or by visible light communication from illumination of the stadium or the like, and may map the received additional information to the video data. Moreover, camera ex102 may perform this mapping based on a certain rule such as a table that is kept in the storage connected to camera ex102 wirelessly or with wires and that indicates correspondence between the information obtained by the visible light communication technology and the additional information. Camera ex102 may perform this mapping by using a result of a most probable combination by Internet search.

Moreover, in the monitoring system, a highly accurate monitoring system can be implemented, for example, by superimposition of information of a person on a blacklist on the user camera carried by a guard in the facility.

Variation 6

Analyzer ex112 may determine which area in the facility or in the stadium the user camera is capturing, by matching the free viewpoint video with the video captured by the user camera. Note that the method for determining the imaging area is not limited thereto, but various methods for determining the imaging area described in each of the above-described embodiments or other methods for determining the imaging area may be used.

Video information processing apparatus ex101 transmits a past video to the user camera based on the analysis result made by analyzer ex112. The user camera superimposes the past video on the captured video, or replaces the captured video with the past video, and displays the video on a screen.

For example, a highlight scene of a first half is displayed as a past video during halftime. This enables the user to enjoy the highlight scene of the first half during halftime as a video captured in a direction in which the user is watching.

Note that the past video is not limited to the highlight scene of the first half, but may be the highlight scene of the past game held in the stadium. Moreover, timing at which video information processing apparatus ex101 distributes the past video is not limited to timing of distributing during halftime, but may be, for example, timing of distributing after the game end or during the game. In particular, in the case of distributing during the game, video information processing apparatus ex101 may distribute a scene which the user has missed and which is considered to be important, based on the analysis result made by analyzer ex112. Moreover, video information processing apparatus ex101 may distribute the past video when there is a user request, or may distribute a message of distribution permission prior to distribution of the past video.

Variation 7

Video information processing apparatus ex101 may transmit advertisement information to the user camera based on the analysis result made by analyzer ex112. The user camera superimposes the advertisement information of the captured video, and displays the superimposed video on a screen.

The advertisement information may be distributed, for example, immediately before distribution of the past video during halftime or after the game end as described in variation 6. This enables a distribution company to obtain advertising rates from an advertiser and to provide the user with video distribution services at a low cost or with no charge. Moreover, video information processing apparatus ex101 may distribute a message of advertisement distribution permission immediately before distribution of the advertisement information, or may provide services with no charge when the user views the advertisement, or may provide services at a lower cost than a cost in the case where the user does not view the advertisement.

Moreover, when the user clicks "Order now" or the like in response to the advertisement, a staff member who knows the position of the user based on the system or some positional information, or an automatic delivery system in the facility delivers an ordered drink to a seat of the user. Payment may be made by hand delivery to the staff member, or may be made based on credit card information set in an app of a mobile terminal or the like in advance. Moreover, the advertisement may include a link to an e-commerce site, and on-line shopping such as ordinary home delivery may be possible.

Variation 8

Video reception apparatus ex103 may be one of the cameras ex102 (user cameras). In this case, analyzer ex112 matches the free viewpoint video with the video captured by the user camera, and accordingly analyzer ex112 determines which area in the facility or in the stadium the user camera is capturing. Note that the method for determining the imaging area is not limited thereto.

For example, when the user performs a swipe operation in a direction of an arrow displayed on a screen, the user camera generates viewpoint information that indicates movement of the viewpoint in the direction. Video information processing apparatus ex101 reads from storage ex111 the video data that captures an area shifted by the amount indicated by the viewpoint information from the area captured by the user camera determined by analyzer ex112, and video information processing apparatus ex101 starts transmission of the read video data to the user camera. Then, the user camera displays the video distributed from video information processing apparatus ex101, instead of the captured video.

This enables the user in the facility or in the stadium to view the video captured from a favorite viewpoint with such a simple operation as screen swipe. For example, a spectator who is watching a game on a third base side of a baseball stadium can view the video captured from the viewpoint on a first base side. Moreover, the monitoring system enables a guard in the facility to view, for example, the video from the viewpoint from which the guard wants to check or the video to be watched closely as an interruption from a center, while changing the viewpoint adaptively, with such a simple operation as screen swipe. For this reason, a highly accurate monitoring system can be implemented.

Moreover, distribution of the video to the user in the facility or in the stadium is effective, for example, even when an obstacle exists between the user camera and an object to be captured, and there is an invisible area. In this case, the user camera may switch the video of some area of the areas captured by the user camera that includes the obstacle, from the captured video to a video distributed from video information processing apparatus ex101, and may display the distributed video, or the user camera may switch the entire screen from the captured video to the distributed video, and may display the distributed video. Moreover, the user camera may combine the captured video with the distributed video to display the video that seems to penetrate the obstacle such that the object to be viewed is visible. Even when the object to be captured is invisible from the position of the user due to influence of the obstacle, this configuration can reduce the influence of the obstacle because the user can view the video distributed from video information processing apparatus ex101.

Moreover, when the distributed video is displayed as the video of the area invisible due to the obstacle, display switching control different from display switching control depending on input processing made by the user such as the screen swipe described above may be performed. For example, when it is determined that the imaging area includes the obstacle, based on information of movement and capturing direction of the user camera, and based on positional information of the obstacle obtained in advance, display switching from the captured video to the distributed video may be performed automatically. Moreover, when it is determined from analysis of the captured video data that the obstacle which is not the object to be captured is being captured, display switching from the captured video to the distributed video may be performed automatically. Moreover, when area of the obstacle in the captured video (for example, a number of pixels) exceeds a predetermined threshold, or when a ratio of the area of the obstacle to area of the object to be captured exceeds a predetermined proportion, display switching from the captured video to the distributed video may be performed automatically.

Note that the display switching from the captured video to the distributed video, and display switching from the distributed video to the captured video may performed in response to the input processing made by the user.
Variation 9

A speed at which the video data is transmitted to video information processing apparatus ex101 may be instructed based on importance of the video data captured by each camera ex102.

In this case, analyzer ex112 determines importance of video data stored in storage ex111 or importance of camera ex102 that captures the video data. The determination of the importance here is made based on, for example, a number of persons or a number of moving objects in the video, the information such as image quality of the video data, or combination thereof.

Moreover, the determination of the importance of the video data may be made based on the position of camera ex102 that captures the video data or the area captured in the video data. For example, when a plurality of other capturing cameras ex102 exists near camera ex102 concerned, the importance of the video data captured by camera ex102 concerned is set low. Moreover, when the position of camera ex102 concerned is distant from the positions of other cameras ex102, but there exists a plurality of other cameras ex102 that captures an identical area, the importance of the video data captured by camera ex102 concerned is set low. Moreover, the determination of the importance of the video data may be made based on frequency of requests in video distribution services. Note that the method for determining the importance is limited to neither the above-described methods nor combination thereof, but may be a method according to the configuration or purpose of the monitoring system or video distribution system.

Moreover, the determination of the importance may not be made based on the captured video data. For example, the importance of camera ex102 that transmits the video data to terminals other than video information processing apparatus ex101 may be set high. Conversely, the importance of camera ex102 that transmits the video data to terminals other than video information processing apparatus ex101 may be set low. Accordingly, for example, when a plurality of services that needs transmission of video data uses a common communication band, a degree of freedom of controlling the communication band according to a purpose or characteristics of each service increases. This prevents quality of each service to degrade because necessary video data cannot be obtained.

Moreover, analyzer ex112 may determine the importance of the video data by using the free viewpoint video and the captured video of camera ex102.

Video information processing apparatus ex101 transmits a communication speed instruction signal to camera ex102 based on a determination result of the importance made by analyzer ex112. Video information processing apparatus ex101 gives instruction of high speed communication to, for example, camera ex102 that is capturing a video with high importance. Moreover, n addition to speed control, regarding important information, video information processing apparatus ex101 may transmit a signal that instructs a scheme for sending the important information twice or more in order to reduce disadvantages owing to loss. This enables efficient communication in the entire facility or in the entire stadium. Note that communication between camera ex102 and video information processing apparatus ex101 may be wired communication, or may be wireless communication. Moreover, video information processing apparatus ex101 may control any one of the wired communication and wireless communication.

Camera ex102 transmits the captured video data to video information processing apparatus ex101 at the communication speed according to the communication speed instruction signal. Note that when retransmission fails predetermined number of times, camera ex102 may stop retransmission of the captured video data and start transmission of next captured video data. This enables efficient communication in the entire facility or in the entire stadium and high-speed processing in analyzer ex112 can be implemented.

Moreover, when the communication speed allocated to each camera ex102 fails to have a bandwidth sufficient for transmitting the captured video data, camera ex102 may convert the captured video data into video data with a bit rate that enables transmission at the allocated communication speed, and transmit the converted video data, or may stop transmission of the video data.

Moreover, as described above, when the video data is used for preventing occurrence of a blind spot, some area of the imaging areas in the captured video data is likely to be needed for filling the blind spot. In this case, camera ex102 may generate extracted video data by extracting at least the area needed for preventing occurrence of the blind spot from the video data, and transmit the generated extracted video data to video information processing apparatus ex101. This configuration can realize suppression of occurrence of the blind spot at a narrower communication bandwidth.

Moreover, for example, when superimposed display or video distribution of the additional information is performed, camera ex102 needs to transmit the positional information and information of the capturing direction of camera ex102 to video information processing apparatus ex101. In this case, camera ex102 to which only the bandwidth insufficient for transmitting the video data is allocated may transmit the positional information and information of the capturing direction detected by camera ex102. Moreover, when video information processing apparatus ex101 estimates the positional information and information of the capturing direction of camera ex102, camera ex102 may convert the captured video data into video data with resolution necessary for estimation of the positional information and the information of the capturing direction, and transmit the converted video data to video information processing apparatus ex101. This configuration can also provide superimposed display or video distribution services of the additional information to camera ex102 to which only the narrow communication bandwidth is allocated. Moreover, since video information processing apparatus ex101 can acquire information of the imaging area from more cameras ex102, video information processing apparatus ex101 is effective, for example, for using information of the imaging area for a purpose of detecting an area that attracts attention, or the like.

Note that the above-described switching of transmission processing of the video data according to the allocated communication bandwidth may be performed by camera ex102 based on the notified communication bandwidth, or video information processing apparatus ex101 may determine the operation of each camera ex102 and notify each camera ex102 of a control signal that indicates the determined operation. This enables appropriate sharing of tasks of processing according to an amount of calculation necessary for determination of switching of the operations, throughput of camera ex102, required communication bandwidth, and the like.
Variation 10

Analyzer ex112 may determine the importance of the video data based on the visual field information (and/or viewpoint information) transmitted from video reception apparatus ex103. For example, analyzer ex112 sets high importance of the captured video data including a lot of areas indicated by the visual field information (and/or viewpoint information). Moreover, analyzer ex112 may determine the importance of the video data in consideration of the number of persons or the number of moving objects in the video. Note that the method for determining the importance is not limited thereto.

Note that a communication control method described in the present embodiment does not necessarily need to be used in a system that reconstructs the three-dimensional shape from the plurality of pieces of video data. For example, when video data is transmitted by wired communication and/or wireless communication selectively or at a different transmission speed in an environment where there exists a plurality of cameras ex102, the communication control method described in the present embodiment is effective.
Variation 11

In the video distribution system, video information processing apparatus ex101 may transmit an outline video that indicates an entire capturing scene to video reception apparatus ex103.

Specifically, when video information processing apparatus ex101 has received a distribution request transmitted from video reception apparatus ex103, video information processing apparatus ex101 reads the outline video of an inside of the entire facility or an inside of the entire stadium from storage ex111, and transmits the external appearance video to video reception apparatus ex103. This outline video may have a long update interval (may have a low frame rate), and may have low image quality. A viewer touches a portion to watch in the outline video displayed on a screen of video reception apparatus ex103. Accordingly, video reception apparatus ex103 transmits the visual field information (and/or viewpoint information) corresponding to the touched portion to video information processing apparatus ex101.

Video information processing apparatus ex101 reads the video data corresponding to the visual field information (and/or viewpoint information) from storage ex111, and transmits the video data to video reception apparatus ex103.

Moreover, analyzer ex112 generates the free viewpoint video by preferentially restoring the three-dimensional shape (three-dimensional reconfiguration) of the area indicated by the visual field information (and/or viewpoint information). Analyzer ex112 restores the three-dimensional shape of an inside of the entire facility or an inside of the entire stadium with accuracy in the extent of indicating the outline. Accordingly, video information processing apparatus ex101 can efficiently restore the three-dimensional shape. As a result, a high frame rate and high image quality of the free viewpoint video of the area the viewer wants to watch can be implemented.
Variation 12

Note that video information processing apparatus ex101 may store in advance as a previous video, for example, three-dimensional shape restored data of the facility or stadium generated in advance from design drawings or the like. Note that the previous video is not limited thereto, but may be virtual space data in which unevenness of space obtained from a depth sensor and a picture derived from a past image or video data or an image or video data at a time of calibration are mapped for each object.

For example, when soccer is played in a stadium, analyzer ex112 may restore the three-dimensional shapes of players and a ball, and generate the free viewpoint video by combining the obtained restored data and the previous video. Alternatively, analyzer ex112 may preferentially restore the three-dimensional shapes of players and a ball. Accordingly, video information processing apparatus ex101 can restore the three-dimensional shape efficiently. As a result, a high frame rate and high image quality of the free viewpoint video regarding players and a ball to which viewers pay attention can be implemented. Moreover, in the monitoring system, analyzer ex112 may restore the three-dimensional shapes of persons and moving objects or preferentially restore the three-dimensional shapes of persons and moving objects.

Variation 13

Time of each apparatus may be calibrated when capturing starts, based on information such as reference time of the server. Analyzer ex112 restores the three-dimensional shape by using the plurality of pieces of video data captured at time within a preset time range among the plurality of pieces of captured video data captured by the plurality of cameras ex102 in accordance with accuracy of time settings. This detection of time uses, for example, time when the captured video data is stored in storage ex111. Note that the method for detecting time is not limited thereto. Accordingly, since video information processing apparatus ex101 can restore the three-dimensional shape efficiently, a high frame rate and high image quality of the free viewpoint video can be implemented.

Alternatively, analyzer ex112 may restore the three-dimensional shape by using high-quality data, or by preferentially using high-quality data among the plurality of pieces of video data stored in storage ex111.

Variation 14

Analyzer ex112 may restore the three-dimensional shape by using camera attribute information. For example, analyzer ex112 may generate the three-dimensional shape video by a method such as a volume intersection technique or a multi-view stereo method by using camera attribute information. In this case, camera ex102 transmits the captured video data and the camera attribute information to video information processing apparatus ex101. Examples of the camera attribute information include a capturing position, a capturing angle, capturing time, and zoom magnification.

Accordingly, since video information processing apparatus ex101 can restore the three-dimensional shape efficiently, a high frame rate and high image quality of the free viewpoint video can be implemented.

Specifically, camera ex102 defines three-dimensional coordinates in the facility or in the stadium, and transmits to video information processing apparatus ex101 information as camera attribute information that indicates an angle, zoom magnification, and time of capturing of certain coordinates by camera ex102, together with the video. Moreover, when camera ex102 is activated, a clock on a communication network in the facility or in the stadium is synchronized with a clock in the camera, and time information is generated.

Figure 16:
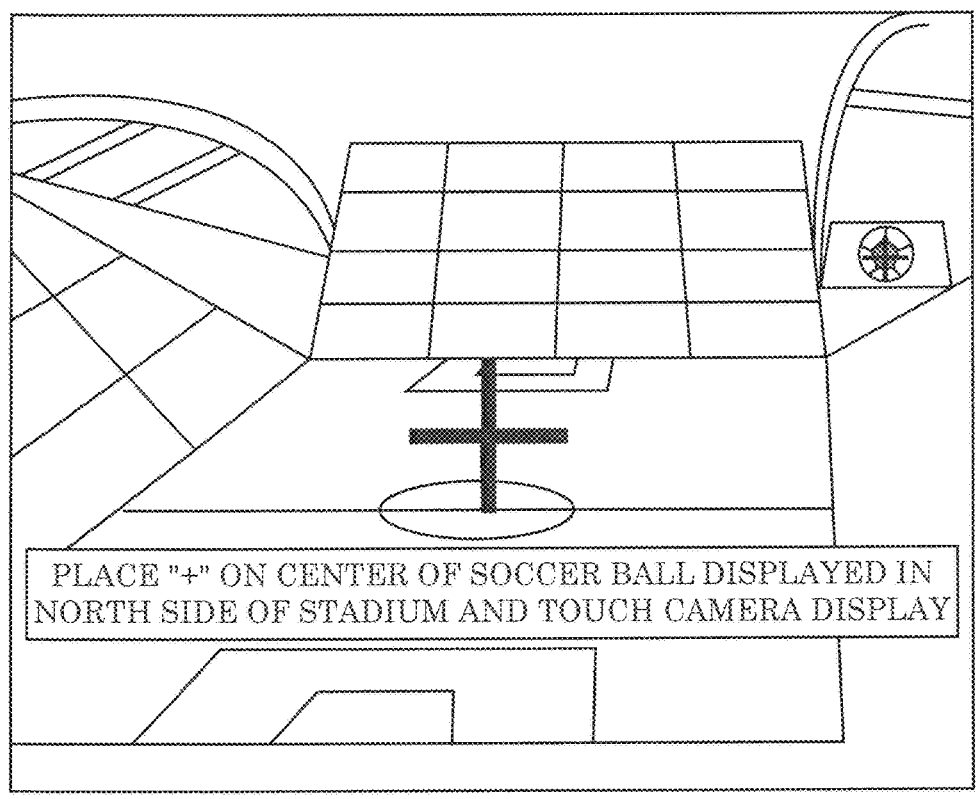
FIG. 16 illustrates one example of a notification screen displayed when a camera is activated.

Moreover, the positional and angle information of camera ex102 is acquired by pointing camera ex102 at a specific point in the facility or in the stadium when camera ex102 is activated or at any timing. FIG. 16 is a diagram illustrating an example of notification displayed on a screen of camera ex102 when camera ex102 is activated. When the user matches "+" displayed in a center of the screen with "+" which is in a center of a soccer ball in advertisement in north of the stadium in response to this notification and touches the display of camera ex102, camera ex102 acquires vector information from camera ex102 to the advertisement, and identifies reference of the camera position and angle. Subsequently, camera coordinates and an angle at each time are identified from motion information of camera ex102. Of course, the display is not limited thereto, and display that instructs coordinates, an angle, or a movement speed of the imaging area during a capturing period by using an arrow or the like may be used.

The coordinates of camera ex102 may be identified by using a radio wave of the global positioning system (GPS), wireless fidelity (Wi-Fi) (registered trademark), third generation (3G), long term evolution (LTE), and fifth generation (5G) (wireless LAN), or by using the near field communication such as beacon (Bluetooth (registered trademark), ultrasonic waves). Moreover, information about which base station in the facility or in the stadium has received the captured video data may be used.

Variation 15

The system may be provided as an application that operates on a mobile terminal such as a smartphone.

Accounts of various social networking services (SNS) or the like may be used for login to the system. Note that an account dedicated to an app or a guest account that has limited functions may be used. Favorite videos, favorite accounts or the like can be evaluated by using the accounts in such a manner. Moreover, the bandwidth is preferentially allocated to, for example, video data similar to video data that is being captured or viewed, or to video data of the viewpoint similar to the viewpoint of video data that is being captured or viewed, and this can increase resolution of these pieces of video data. Accordingly, the three-dimensional shape from these viewpoints can be restored with better accuracy.

Moreover, the user can preferentially watch the selected image over other users by selecting a favorite image video and by following the other party with the application, or the user can have connection by text chatting or the like on condition of approval of the other party. Thus, it is possible to generate a new community.

Thus, connection between the users in the community can activate capturing itself or sharing of captured images, and can prompt restoration of three-dimensional shapes with higher accuracy.

Moreover, according to settings of connection in the community, the user can edit images or videos captured by another person, or can perform collage of an image of another person and an image of the user to create a new image or video. This enables sharing of a new video work, such as sharing the new image or video with persons in the community. Moreover, the video work can also be used for a game of augmented reality or the like by inserting a computer-graphics (CG) character in this editing.

Moreover, since the system enables sequential output of three-dimensional model data, a 3D printer or the like that the facility has can output a three-dimensional object, based on the three-dimensional model data in a characteristic scene such as a goal scene. This also enables sale after the game of an object based on the scene during the game as a souvenir such as a key ring, or distribution after the game of such an object to participating users. Of course, this also enables printing of an image captured from the best viewpoint as an ordinary photograph.

Variation 16

A center connected to the system can used the above-described system to manage a rough state of the overall region, for example, from a video of a vehicle-mounted camera of the police and a wearable camera of a police officer, and the like.

During ordinary patrol, still images are transmitted and received, for example, every several minutes. Moreover, the center identifies a region in which crime is highly likely to occur, based on a criminal map prepared based on a result of analysis using past criminal data or the like. Alternatively, the center keeps regional data related to a crime rate identified in this manner. In a region with the identified high-crime-rate, high frequency of transmission and reception of images may be set, or a change of images to moving images may be made. Moreover, when an incident occurs, moving images or three-dimensional reconfiguration data using SfM may be used. Moreover, the center or each terminal can compensate the image or virtual space by simultaneously using information from other sensors such as a depth sensor and a thermal sensor, and accordingly the police officer can understand the situation with better accuracy.

Moreover, the center can used the three-dimensional reconfiguration data to feed back information of the object to the plurality of terminals. This enables each individual person having a terminal to keep track of the object.

Moreover, in these years, capturing has been performed from the air by an apparatus that can fly such as a quadcopter and a drone, for purposes of investigation of buildings or environment, capturing with realism such as sports or the like. While blur of images is likely to become a problem in capturing by such an autonomous moving apparatus, SfM can create three dimensions while compensating the blur with a position and an inclination. This can realize improvement in image quality and improvement in restoration accuracy of space.

Moreover, installation of a vehicle-mounted camera that captures an outside of a car is mandatory in some countries. In such a vehicle-mounted camera, weather and a road surface state in a direction of a destination, traffic congestion level and the like can be understood with better accuracy by using three-dimensional data modeled from a plurality of images.

Variation 17

The above-described system may also be applied to a system that performs distance measurement or modeling of a building or equipment by using a plurality of cameras, for example.

Here, for example, in a case of capturing an image of a building from above using one drone, and performing distance measurement or modeling of the building, there is a problem in that an image of an animal may be captured by the camera during distance measurement, thereby reducing the accuracy of distance measurement. There is also a problem in that distance measurement and modeling cannot be performed with respect to an animal.

Meanwhile, by using a plurality of cameras (fixed cameras, smartphones, wearable cameras, drones, etc.) as described above, distance measurement and modeling of a building may be performed with stable accuracy regardless of presence or absence of an animal. Also, distance measurement and modeling may be performed with respect to an animal.

Specifically, for example, at a construction site, a camera is attached to a helmet or the like of a worker. This allows distance measurement of the building to be performed in parallel to the work of the worker. Also, efficiency of work may be increased, and mistakes may be prevented. Furthermore, modeling of the building may be performed by using a video captured by the camera worn by the worker. Moreover, a manager at a remote location may check the progress by looking at a modeled building.

Moreover, this system may be used for inspection of equipment that cannot be stopped, such as a machine at a factory or a power station. Also, this system can be used to inspect opening/closing of a bridge or a dam, or to inspect an abnormality in the operation of a ride in an amusement park, for example.

Moreover, by monitoring the level of traffic jam or the amount of traffic on a road by this system, a map indicating the level of traffic jam or the amount of traffic on the road in each time zone may be created.

Embodiment 5

The processing described in each of the above-described embodiments can be carried out easily in a standalone computer system by recording a program for implementing the configuration of the image processing method described in each embodiment on a storage medium. The storage medium may be any type of medium capable of storing the program, such as a magnetic disk, an optical disc, a magneto-optical disk, an integrated circuit (IC) card, and a semiconductor memory.

Here, application examples of the image processing method described in each of the embodiments and the systems using the application examples will be further described. The systems include an apparatus that uses the image processing method. A change in other configurations of the systems can be made appropriately in accordance with the circumstances.

Figure 17:
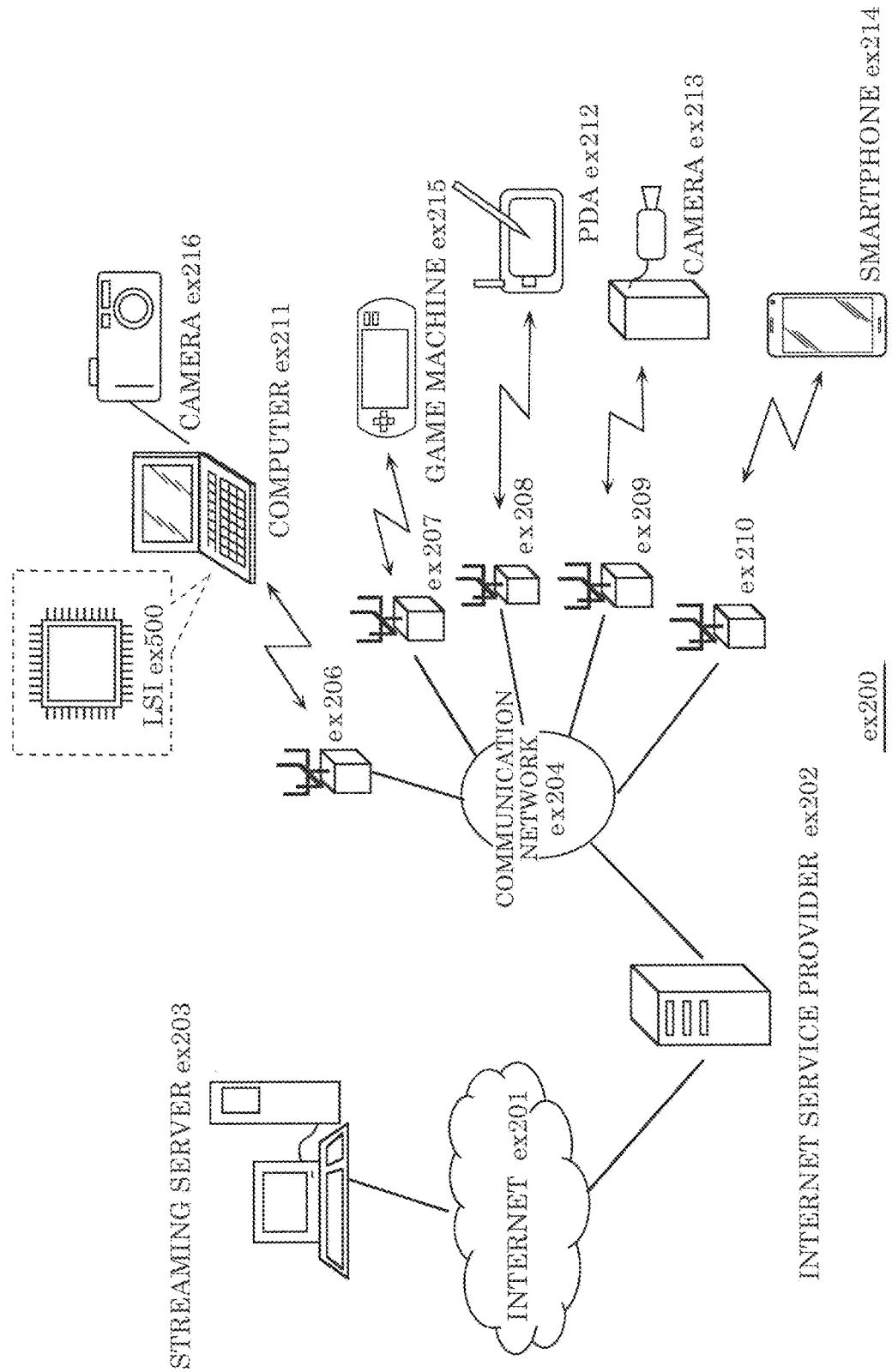
FIG. 17 illustrates an overall configuration of a content providing system that implements content distribution services.

FIG. 17 is a diagram illustrating an overall configuration of content providing system ex200 that implements content distribution services. An area in which communication services are provided is divided with a desired size. Base stations ex206, ex207, ex208, ex209, and ex210 which are fixed wireless stations are installed in respective cells.

In content providing system ex200, various devices such as computer ex211, personal digital assistant (PDA) ex212, camera ex213, smartphone ex214, and game machine ex215 are connected to Internet ex201 via Internet service provider ex202, wide area network (WAN) ex204, and base stations ex206 to ex210.

However, the configuration of content providing system ex200 is not limited to the configuration illustrated in FIG. 17, and any elements may be combined and connected. Moreover, each device may be connected directly to telephone lines, cable TV, or WAN ex204 such as optical communication, instead of via base stations ex206 to ex210 which are fixed wireless stations. Alternatively, each device may be interconnected directly via near field communication or the like.

Camera ex213 is a device capable of capturing moving images, such as a digital camcorder. Camera ex216 is a device capable of capturing still images and moving images, such as a digital camera. Moreover, smartphone ex214 is, for example, a smartphone conforming to a global system for mobile communication (GSM) (registered trademark) scheme, a code division multiple access (CDMA) scheme, a wideband-code division multiple access (W-CDMA) scheme, an long term evolution (LTE) scheme, an high speed packet access (HSPA) scheme, or a communication scheme using high-frequency bands, or a personal handyphone system (PHS), and smartphone ex214 may be any of them.

In content providing system ex200, camera ex213 or the like is connected to streaming server ex203 via base station ex209 and WAN ex204. Accordingly, live streaming or the like becomes possible. In the live streaming, coding processing is performed on content (for example, a video of a music event) captured by the user using camera ex213 and the resulting content is transmitted to streaming server ex203. Meanwhile, streaming server ex203 perform stream distribution of content data transmitted to a client that has made a request. Examples of the client include computer ex211, PDA ex212, camera ex213, smartphone ex214, and game machine ex215 capable of decoding the data that has undergone the coding processing. Each device that has received the distributed data performs decoding processing on the received data to reproduce the data.

Note that the coding processing of the captured video may be performed by camera ex213, or may be performed by streaming server ex203 that performs data transmission processing, or camera ex213 and streaming server ex203 may share tasks of the coding processing of the captured video with each other. Similarly, the decoding processing of the distributed data may be performed by the client, or may be performed by streaming server ex203, or the client and streaming server ex203 may share tasks of the decoding processing of the captured video with each other. Moreover, in addition to still and/or moving image data captured by camera ex213, still and/or moving image data captured by camera ex216 may be transmitted to streaming server ex203 via computer ex211. In this case, the coding processing may be performed by any of camera ex216, computer ex211, and streaming server ex203, or camera ex216, computer ex211, and streaming server ex203 may share tasks of the coding processing with each other. Further, regarding display of the decoded image, a plurality of devices connected to the system may cooperate to display an identical image, or a device having a large display unit may display the entire image and a device such as smartphone ex214 may enlarge and display some area of the image.

Moreover, the coding processing and the decoding processing are performed in general by LSI ex500 in computer ex211 or each device. LSI ex500 may include a single chip or a plurality of chips. Note that software for coding/decoding a moving image may be recorded on any recording medium (such as a CD-ROM, a flexible disk, and a hard disk) that is readable by computer ex211 or the like, and the coding processing and the decoding processing may be performed using the software. Further, in the case where smartphone ex214 is equipped with a camera, moving image data acquired by the camera may be transmitted. This moving image data is data that has been coded by LSI ex500 in smartphone ex214.

Moreover, streaming server ex203 may be a plurality of servers or a plurality of computers that processes, records, and distributes data.

In the above-described manner, content providing system ex200 enables the client to receive and reproduce coded data. Thus, content providing system ex200 enables the client to receive, decode, and reproduce in real time information transmitted by a user, and enables even a user having no special right or equipment to implement personal broadcasting.

Figure 18:
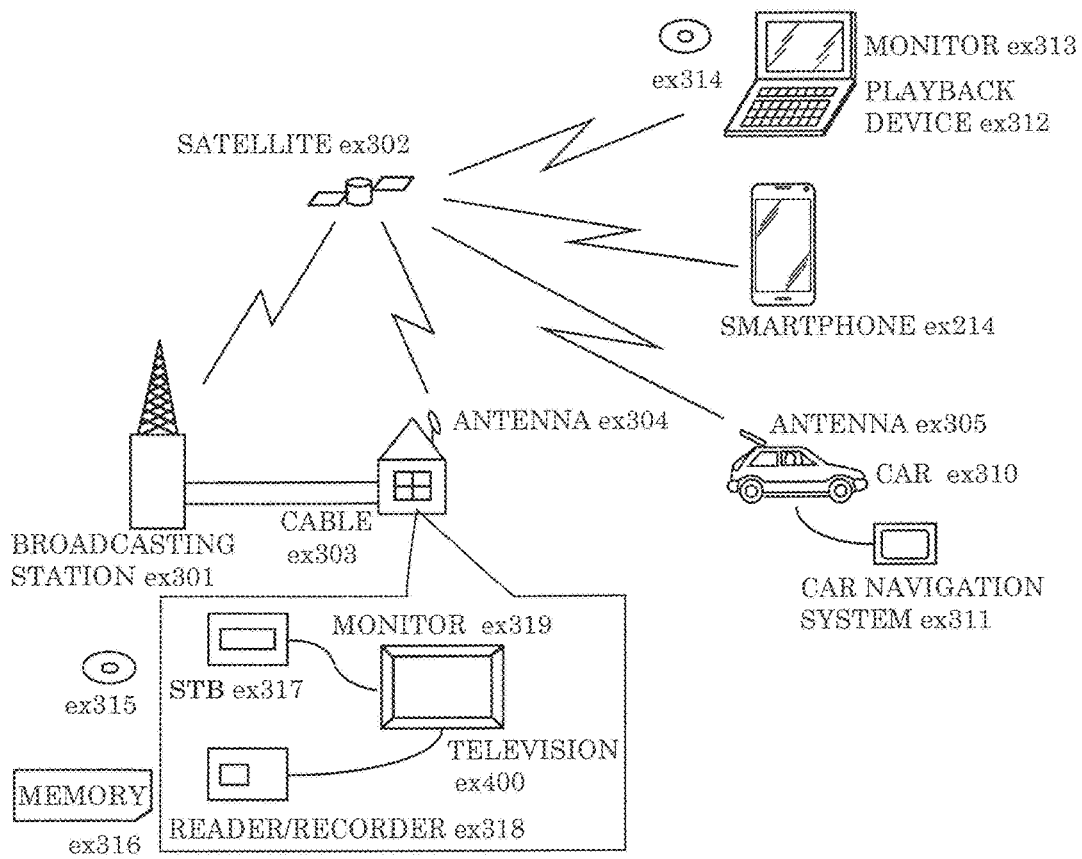
FIG. 18 illustrates an overall configuration of a digital broadcasting system.

Note that in addition to the example of content providing system ex200, each of the above-described embodiments may also be applied to digital broadcasting system ex300, as illustrated in FIG. 18. Specifically, broadcasting station ex301 transmits multiplexed data obtained by multiplexing video data with music data or the like via a radio wave to communication or satellite ex302. This video data is data coded by the moving image coding method described in each of the above-described embodiments. Broadcasting satellite ex302 that has received this data transmits a broadcasting radio wave, and home antenna ex304 capable of receiving satellite broadcasting receives this radio wave. An apparatus such as television (receiver) ex400 or set top box (STB) ex317 decodes and reproduces the received multiplexed data.

Moreover, the moving image decoding apparatus or the moving image coding apparatus described in each of the above-described embodiments can be implemented in reader/recorder ex318 that reads and decodes the multiplexed data recorded on recording medium ex315 such as a digital versatile disc (DVD) and a blu-ray disc (BD) or memory ex316 such as an secured digital (SD), or that codes a video signal and further multiplexes the video signal with a music signal depending on circumstances, and writes the resulting signal on recording medium ex315 or memory ex316. In this case, monitor ex319 may display the reproduced video signal, and another apparatus or system can reproduce the video signal by using recording medium ex315 or memory ex316 having the multiplexed data recorded thereon. Moreover, the moving image decoding apparatus may be implemented in set top box ex317 connected to cable ex303 for a community antenna television system (CATV) or antenna ex304 for satellite/terrestrial broadcasting, and monitor ex319 of the television may display the video signal. At this time, the moving image decoding apparatus may be incorporated into the television instead of the set top box.

Figure 19:
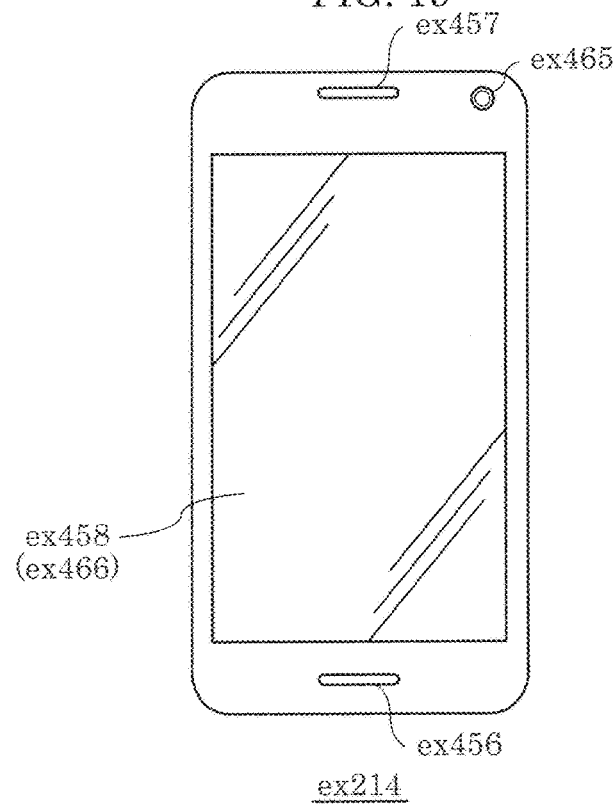
FIG. 19 illustrates one example of a smartphone.
Figure 20:
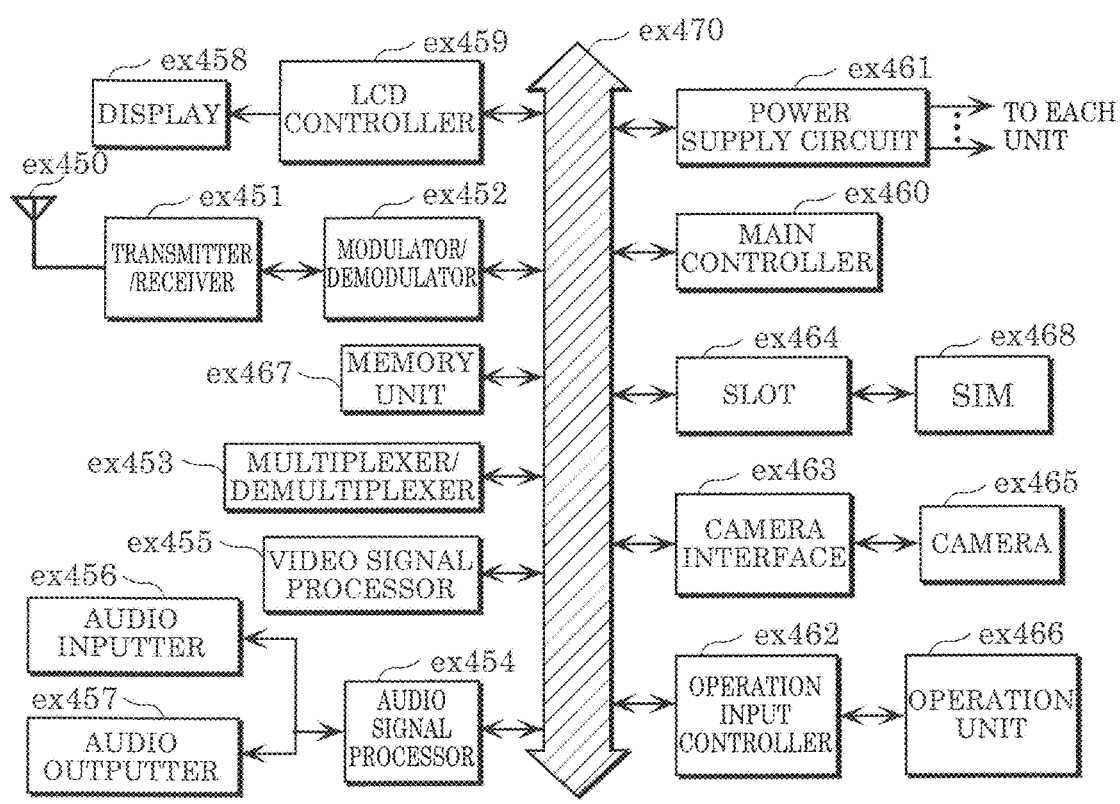
FIG. 20 is a block diagram illustrating an example of a configuration of a smartphone.

FIG. 19 is a diagram illustrating smartphone ex214. Moreover, FIG. 20 is a diagram illustrating a configuration example of smartphone ex214. Smartphone ex214 includes antenna ex450 that transmits and receives a radio wave to and from base station ex210, camera ex465 capable of capturing a video and a still image, and display unit ex458 such as a liquid crystal display that displays the video captured by camera ex465 and data obtained by decoding a video or the like received on antenna ex450. Smartphone ex214 further includes operation unit ex466 which is a touch panel or the like, audio outputter ex457 such as a speaker for outputting audio, audio inputter ex456 such as a microphone for inputting audio, memory unit ex467 capable of storing coded data or decoded data of a captured video, a captured still image, recorded audio, a received video, a received still image, or a received email, memory ex316 illustrated in FIG. 18, or slot ex464 which is an interface to SIM ex468 for identifying a user and for authentication of access to various types of data including a network.

In smartphone ex214, power supply circuit ex461, operation input controller ex462, video signal processor ex455, camera interface ex463, liquid crystal display (LCD) controller ex459, modulator/demodulator ex452, multiplexer/demultiplexer ex453, audio signal processor ex454, slot ex464, and memory unit ex467 are connected via bus ex470 to main controller ex460 that comprehensively controls display unit ex458, operation unit ex466 and the like, respectively.

When an on-hook/power key is turned on by a user operation, power supply circuit ex461 supplies electric power to each unit from a battery pack, and accordingly activates smartphone ex214 into an operable state.

In smartphone ex214 based on control of main controller ex460 that includes a CPU, a ROM, a RAM and the like, audio signal processor ex454 converts an audio signal recorded with audio inputter ex456 in a voice call mode into a digital audio signal, and modulator/demodulator ex452 performs spread spectrum processing on this digital audio signal, and transmitter/receiver ex451 performs digital-to-analog conversion processing and frequency conversion processing on this signal and then transmits the resulting signal via antenna ex450. Moreover, smartphone ex214, amplifies reception data received via antenna ex450 in the voice call mode and performs frequency conversion processing and analog-to-digital conversion processing on the data, and modulator/demodulator ex452 performs spread spectrum processing on the resulting signal, and audio signal processor ex454 converts the resulting signal into an analog audio signal, and then audio outputter ex457 outputs the analog audio signal.

In the case where an email is transmitted in a data communication mode, text data of the email input by operation of operation unit ex466 or the like of a body is sent to main controller ex460 via operation input controller ex462. In main controller ex460 modulator/demodulator ex452 performs spread spectrum processing on the text data, and transmitter/receiver ex451 performs digital-to-analog conversion processing and frequency conversion processing on the text data and then transmits the resulting text data to base station ex210 via antenna ex450. In the case of receiving an email, substantially the opposite processing is performed on the received data, and the resulting data is output to display unit ex458.

In the case where a video, a still image, or a combination of a video and audio are transmitted in the data communication mode, video signal processor ex455 compresses and codes a video signal supplied from camera ex465 by the moving image coding method described in each of the above embodiments, and sends the coded video data to multiplexer/demultiplexer ex453. Moreover, audio signal processor ex454 codes an audio signal recorded with audio inputter ex456 while the video, the still image, or the like is being captured by camera ex465, and sends the coded audio data to multiplexer/demultiplexer ex453.

Multiplexer/demultiplexer ex453 multiplexes the coded video data supplied from video signal processor ex455 and the coded audio data supplied from audio signal processor ex454 by a predetermined scheme. Modulator/demodulator (modulation/demodulation circuit) ex452 performs spread spectrum processing on the resulting multiplexed data. Transmitter/receiver ex451 performs digital-to-analog conversion processing and frequency conversion processing on the multiplexed data, and then transmits the resulting data via antenna ex450.

In the case of receiving data of a moving image file linked to a website or the like in the data communication mode, or in the case of receiving an email having a video or audio attached thereto, multiplexer/demultiplexer ex453 demultiplexes multiplexed data into a bitstream of video data and a bitstream of audio data in order to decode the multiplexed data received via antenna ex450. Multiplexer/demultiplexer ex453 supplies the coded video data to video signal processor ex455 and the coded audio data to audio signal processor ex454 via synchronization bus ex470. Video signal processor ex455 decodes the video signal by a moving image decoding method corresponding to the moving image coding method described in each of the above embodiments. Display unit ex458 displays via LCD controller ex459 a video or still image in the moving image file linked to the website. Moreover, audio signal processor ex454 decodes the audio signal, and audio outputter ex457 outputs audio.

Moreover, like television ex400, three implementation forms of a terminal such as smartphone ex214, that is, a transmission/reception terminal including both an encoder and a decoder, a transmission terminal including an encoder, and a reception terminal including a decoder, are conceivable. Further, digital broadcasting system ex300 in which multiplexed data obtained by multiplexing video data with music data or the like is received and transmitted is described above; however, the multiplexed data may be data obtained by multiplexing text data or the like related to the video other than audio data, or may be video data as is instead of the multiplexed data.

The present disclosure is not limited to such embodiments described above, and various variations and modifications may be made without departing from the scope of the present disclosure.

Note that in the above embodiments, each of the elements may be constituted by dedicated hardware, or may be implemented by executing a software program suitable for the element. Each element may be achieved by a program executor such as a CPU or a processor reading and executing a software program recorded on a recording medium such as a hard disk or semiconductor memory. Here, the software that achieves, for instance, the imaging system according to the above embodiments is a program as below.

Specifically, this program is for causing a computer to execute a calibration method performed by an imaging system that calibrates a parameter of a camera, the calibration method including: causing a movable object that includes a marker for use in calibration to move into an imaging area of the camera; causing the camera to image the marker; and calibrating an internal parameter of the camera, using an image that includes the marker, the image being captured by the camera imaging the marker.

The above has given a description of the imaging system and the calibration method according to one or more aspects of the present disclosure, based on the embodiments, yet the present disclosure is not limited to these embodiments. Various modifications to the embodiments that may be conceived by those skilled in the art and combinations of elements in different embodiments may be included within the scope of the one or more aspects of the present disclosure, as long as the modifications and the combinations do not depart from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is useful as an imaging system, for instance, that can readily calibrate internal parameters of the imaging apparatus disposed in a predetermined position.

What is claimed is:

1. An imaging system that calibrates a parameter of an imaging apparatus disposed in a predetermined position, the imaging system comprising:
   a movement controller that causes a movable object that includes a marker for use in calibration to move into an imaging area of the imaging apparatus;
   an imaging controller that causes the imaging apparatus to image the marker; and
   a calibrator that calibrates an internal parameter of the imaging apparatus, using an image that includes the marker, the image being captured by the imaging apparatus imaging the marker, wherein
   the movable object includes a display apparatus that displays the marker, and
   the display apparatus is configured to change the shape of the marker displayed so that the shape of the marker included in an image captured by the imaging apparatus is rectangular or square.

2. The imaging system according to claim 1, wherein
the movement controller causes the movable object to move, to cause the marker to be imaged over an entirety of an image sensor that is included in the imaging apparatus.

3. The imaging system according to claim 2, wherein
using a result obtained by processing an image captured by the imaging apparatus, the movement controller causes the movable object to move, to include the marker over an entirety of an image captured by the imaging apparatus.

4. The imaging system according to claim 2, wherein
the movement controller causes, using a result obtained by processing an image captured by the imaging apparatus, the movable object to move, to include the marker in a first area in a first image and to include the marker in a second area in a second image, the first image and the second image being included in a plurality of images captured by the imaging apparatus at different times,
each of the plurality of images including the first area and the second area, and
the first area and the second area being different areas from each other within each of the plurality of images.

5. The imaging system according to claim 4, wherein
using a result obtained by processing an image captured by the imaging apparatus, the movement controller causes the movable object to move to positions in which the markers that have sharpness higher than or equal to predetermined sharpness are captured in the images.

6. The imaging system according to claim 1, wherein
the imaging controller causes the imaging apparatus to capture an image in a state in which the imaging apparatus has at least one of a predetermined focal distance or a predetermined aperture.

7. The imaging system according to claim 1, wherein
the marker has first feature points, and
the calibrator obtains information indicating a relative positional relationship of the first feature points, and calibrates the internal parameter of the imaging apparatus, using the information and second feature points obtained by processing the image including the marker and captured by the imaging apparatus.

8. A calibration method performed by an imaging system that calibrates a parameter of an imaging apparatus, the calibration method comprising:
causing a movable object that includes a marker for use in calibration to move into an imaging area of the imaging apparatus, the movable object also including a display apparatus that displays the marker;
causing the imaging apparatus to image the marker;
calibrating an internal parameter of the imaging apparatus, using an image that includes the marker, the image being captured by the imaging apparatus imaging the marker; and
changing, by the display apparatus, the shape of the marker displayed so that the shape of the marker included in an image captured by the imaging apparatus is rectangular or square.

9. A calibrator for a camera, comprising:
a controlling circuit configured to control a movable body to move into a shooting area of the camera, a marker being provided on the movable body for calibration of the camera and a display apparatus also being provided on the movable body that displays the marker;
a photographing circuit configured to control the camera to photograph the marker;
a calculating circuit configured to calculate at least one parameter of the camera based on the photographed marker; and
an instructing circuit configured to transmit the at least one parameter to the camera to calibrate the camera, wherein
the display apparatus is configured to change the shape of the marker displayed so that the shape of the photographed marker is rectangular or square.

10. The calibrator according to claim 9, wherein the at least one parameter includes at least one of a focal distance, an aberration, or an image center.

11. The calibrator according to claim 9, wherein the controlling circuit, the photographing circuit, the calculating circuit, and the instructing circuit are implemented in a single processor.

12. The calibrator according to claim 9, wherein the movable body is an unmanned aircraft.

13. The imaging system according to claim 1, wherein the shape of the marker displayed on the display apparatus that has been changed is different from rectangular or square.

14. The calibration method according to claim 8, wherein the shape of the marker displayed on the display apparatus that has been changed is different from rectangular or square.

15. The calibrator according to claim 9, wherein the shape of the marker displayed on the display apparatus that has been changed is different from rectangular or square.

* * * * *